United States Patent
Ayyalasomayajula et al.

(10) Patent No.: US 11,140,651 B2
(45) Date of Patent: Oct. 5, 2021

(54) LOCATION DETERMINATION OF WIRELESS COMMUNICATIONS DEVICES

(71) Applicant: The Regents of the University of California, Oakland, CA (US)

(72) Inventors: Sai Roshan Ayyalasomayajula, San Diego, CA (US); Dinesh Bharadia, San Diego, CA (US); Deepak Vasisht, Cambridge, MA (US); Dina Katabi, Oakland, CA (US)

(73) Assignee: The Regents of the University of California, Oakland, CA (US)

( * ) Notice: Subject to any disclaimer, the term of this patent is extended or adjusted under 35 U.S.C. 154(b) by 0 days.

(21) Appl. No.: 16/731,738

(22) Filed: Dec. 31, 2019

(65) Prior Publication Data

US 2020/0213971 A1 Jul. 2, 2020

Related U.S. Application Data

(60) Provisional application No. 62/787,041, filed on Dec. 31, 2018.

(51) Int. Cl.
*H04W 24/00* (2009.01)
*H04W 64/00* (2009.01)
(Continued)

(52) U.S. Cl.
CPC ........ *H04W 64/003* (2013.01); *H04B 7/0626* (2013.01); *H04L 5/023* (2013.01);
(Continued)

(58) Field of Classification Search
CPC . H04W 64/003; H04W 4/80; H04W 72/0453; H04W 4/029; H04B 7/0626; H04L 5/023; H04L 27/2657
(Continued)

(56) References Cited

U.S. PATENT DOCUMENTS

| | | | | |
|---|---|---|---|---|
| 6,195,556 B1 * | 2/2001 | Reudink | ................... | G01S 5/12 342/457 |
| 6,236,849 B1 * | 5/2001 | Reudink | ................... | G01S 5/12 342/457 |

(Continued)

OTHER PUBLICATIONS

V. Bahl and V. Padmanabhan. RADAR: An In-Building RF-based User Location and Tracking System. INFOCOM, 2000.
(Continued)

*Primary Examiner* — Amancio Gonzalez
(74) *Attorney, Agent, or Firm* — Mintz Levin Cohn Ferris Glovsky and Popeo, P.C.

(57) ABSTRACT

A method, a system, and a computer program product for determining a location of a communication device. Data corresponding to a detected transmission of a data packet between a tag device and one or more communication devices is received on one or more communication channels. At least one of a channel state information and a signal strength associated with the detected transmission for each frequency band in a plurality of frequency bands are determined. Based on the determined channel state information, one or more lengths of signal paths corresponding to the detected transmission of the data packet are determined. A shortest length in across one or more communication devices is selected to determine a location of the tag device.

19 Claims, 21 Drawing Sheets

(51) Int. Cl.

| | |
|---|---|
| H04W 4/80 | (2018.01) |
| H04B 7/06 | (2006.01) |
| H04W 72/04 | (2009.01) |
| H04L 5/02 | (2006.01) |
| H04W 4/029 | (2018.01) |
| H04L 27/26 | (2006.01) |

(52) U.S. Cl.
CPC ......... *H04L 27/2657* (2013.01); *H04W 4/029* (2018.02); *H04W 4/80* (2018.02); *H04W 72/0453* (2013.01)

(58) Field of Classification Search
USPC ...................................................... 455/456.1
See application file for complete search history.

(56) References Cited

U.S. PATENT DOCUMENTS

| | | | | |
|---|---|---|---|---|
| 7,295,119 | B2* | 11/2007 | Rappaport | G06F 30/18 340/572.4 |
| 8,102,754 | B2* | 1/2012 | Baldemair | H04L 27/2662 370/203 |
| 8,620,301 | B1* | 12/2013 | Hessel | H04W 24/02 455/423 |
| 9,049,042 | B2* | 6/2015 | Tagg | H04L 12/2856 |
| 9,439,040 | B2* | 9/2016 | Hua | G06T 5/20 |
| 9,456,433 | B2* | 9/2016 | Bhanage | H04W 64/00 |
| 9,710,818 | B2 | 7/2017 | Henkin et al. | |
| 9,711,041 | B2* | 7/2017 | Wiley | H04L 25/0272 |
| 9,829,563 | B2* | 11/2017 | Xiao | G01S 5/0215 |
| 9,936,333 | B2 | 4/2018 | Lau et al. | |
| 9,961,495 | B2* | 5/2018 | Katabi | H04W 4/023 |
| 10,158,555 | B2* | 12/2018 | Ghosh | H04W 40/248 |
| 10,425,131 | B2* | 9/2019 | Zeine | H02J 50/90 |
| 10,502,811 | B2* | 12/2019 | Li | G01S 5/0081 |
| 2014/0064112 | A1* | 3/2014 | Das | G01S 5/0257 370/252 |
| 2018/0120793 | A1* | 5/2018 | Tiwari | G06Q 10/06 |
| 2020/0103232 | A1* | 4/2020 | Chan | G01C 21/206 |

OTHER PUBLICATIONS

L. Chang, X. Chen, Y. Wang, D. Fang, J. Wang, T. Xing, and Z. Tang. Fitloc: Finegrained and low-cost device-free localization for multiple targets over various areas. IEEE/ACM Transactions on Networking (TON), 2017.
D. Musicki and W. Koch. Geolocation using tdoa and fdoa measurements. In Information Fusion, 2008 11th International Conference On, pp. 1-8. IEEE, 2008.
S. Sen, J. Lee, K.-H. Kim, and P. Congdon. Avoiding Multipath to Revive Inbuilding Wi-Fi Localization. MobiSys, 2013.
Y. Wang, Q. Ye, J. Cheng, and L. Wang. Rssi-based bluetooth indoor localization. In 2015 11th International Conference on Mobile Ad-hoc and Sensor Networks (MSN), 2015.
C. Xu, B. Firner, Y. Zhang, R. Howard, J. Li, and X. Lin. Improving RF-based Devicefree Passive Localization in Cluttered Indoor Environments Through Probabilistic Classification Methods. IPSN, 2012.
TrackR. TrackR Pixel, https://secure.thetrackr.com/ [now https://www.thetrackr.com/get-trackr/].
O. Abari, D. Vasisht, D. Katabi, and A. Chandrakasan. Caraoke: An e-toll transponder network for smart cities. In ACM SIGCOMM, 2015.
Apple. iBeacon. <https://developer.apple.com/ibeacon/>.
I. Afyouni, C. Ray, and C. Claramunt. Spatial Models for Context-Aware Indoor Navigation Systems: A Survey. JOSIS, 2012.
D. Chen, K. G. Shin, Y. Jiang, and K.-H. Kim. Locating and tracking ble beacons with smartphones. In CoNEXT, 2017.
K. Chintalapudi, A. Padmanabha Iyer, and V. N. Padmanabhan. Indoor Localization Without the Pain. MobiCom, 2010.
Estimote. Estimote. <https://estimote.com/>.

Ettus Research. Universal Software Radio Peripheral N210. <https://www.ettus.com/>.
Chipolo. Chipolo Classic, <https://chipolo.net/>.
C. Gomez, J. Oller, and J. Paradells. Overview and evaluation of bluetooth low energy: An emerging low-power wireless technology. IEEE Sensors, 2012.
Google. Project Eddystone, <https://developers.google.com/beacons/>.
Google. Web Bluetooth, <https://webbluetoothcg.github.io/web-bluetooth/>.
Grand View Research Inc. Bluetooth Beacon Market Worth $58.7 Billion By 2025, 2017. <https://www.grandviewresearch.com/press-release/global-bluetoothbeacons>-market.
V. Iyer, V. Talia, B. Kellogg, S. Gollakota, and J. Smith. Inter-technology backscatter: Towards internet connectivity for implanted devices. In SIGCOMM, 2016.
K. Joshi, S. Hong, and S. Katti. Pinpoint: Localizing Interfering Radios. NSDI, 2013.
B. Kellogg, A. Parks, S. Gollakota, J. R. Smith, and D. Wetherall. Wi-fi backscatter: Internet connectivity for rf-powered devices. In ACM SIGCOMM Computer Communication Review, 2014.
B. Kellogg, V. Talia, S. Gollakota, and J. R. Smith. Passive wi-fi: Bringing low power to wi-fi transmissions. In NSDI, 2016.
M. Kotaru, K. Joshi, D. Bharadia, and S. Katti. SpotFi: Decimeter Level Localization Using WiFi. SIGCOMM, 2015.
M. Kotaru, P. Zhang, and S. Katti. Localizing low-power backscatter tags using commodity wifi. In CoNEXT, 2017.
S. Kumar, S. Gil, D. Katabi, and D. Rus. Accurate Indoor Localization with Zero Start-up Cost. MobiCom, 2014.
The Lake Companies Inc. Beacon-Trak. http://www.lakeco.com/lake-products/beacon-trak/.
Y. Ma, N. Selby, and F. Adib. Drone relays for battery-free networks. In SIGCOMM.
Y. Ma, N. Selby, and F. Adib. Minding the billions: Ultra-wideband localization for deployed rfid tags. In MobiCom, 2017.
Q. Pu, S. Gupta, S. Gollakota, and S. Patel. Whole-home Gesture Recognition Using Wireless Signals. MobiCom, 2013.
M. Ros, J. Boom, G. d. Hosson, and M. D'Souza. Indoor Localisation Using a Context-Aware Dynamic Position Tracking Model. International Journal of Navigation and Observation, 2012.
E. Soltanaghaei, A. Kalyanaraman, and K. Whitehouse. Multipath triangulation:Decimeter-level wifi localization and orientation with a single unaided receiver. In MobiSyS, 2018.
Tile. Tile Mate, <https://www.thetileapp.com/>.
D. Vasisht, S. Kumar, and D. Katabi. Decimeter-Level Localization with a Single Wi-Fi Access Point. NSDI, 2016.
VICON T-Series. <www.vicon.com/products/documents/Tseries.pdf>.
J. Wang, F. Adib, R. Knepper, D. Katabi, and D. Rus. RF-compass: Robot Object Manipulation Using RFIDs. MobiCom, 2013.
J. Wang, H. Jiang, J. Xiong, K. Jamieson, X. Chen, D. Fang, and B. Xie. LiFS: Low Human-effort, Device-free Localization with Fine-grained Subcarrier Information. MobiCom, 2016.
J. Wang and D. Katabi. Dude, Where's My Card?: RFID Positioning That Works with Multipath and Non-line of Sight. SIGCOMM, 2013.
J. Wang, D. Vasisht, and D. Katabi. Rf-idraw: Virtual touch screen in the air using rf signals. ACM SIGCOMM, 2014.
Y. Xie, J. Xiong, M. Li, and K. Jamieson, xd-track: leveraging multi-dimensional information for passive wi-fi tracking. In HotWireless, pp. 39-43. ACM, 2016.
J. Xiong and K. Jamieson. ArrayTrack: A Fine-grained Indoor Location System. SDI, 2013.
J. Xiong, K. Jamieson, and K. Sundaresan. Synchronicity: Pushing the envelope of fine-grained localization with distributed mimo. In HotWireless, 2014.
J. Xiong, K. Sundaresan, and K. Jamieson. ToneTrack: Leveraging Frequency-Agile Radios for Time-Based Indoor Wireless Localization. MobiCom, 2015.
L. Yang, Y. Chen, X.-Y. Li, C. Xiao, M. Li, and Y. Liu. Tagoram: Real-time tracking of mobile rfid tags to high precision using cots devices. MobiCom, 2014.

(56) References Cited

OTHER PUBLICATIONS

Z. Yang, Z. Zhou, and Y. Liu. From rssi to csi: Indoor localization via channel response. ACM Comput. Surv., 2013.
P. Zhang, D. Bharadia, K. Joshi, and S. Katti. Hitchhike: Practical backscatter using commodity wifi. In SenSys, 2016.

* cited by examiner

LOCATION DETERMINATION OF WIRELESS COMMUNICATIONS DEVICES

CROSS-REFERENCE TO RELATED APPLICATIONS

The present application claims priority to U.S. Provisional Patent Appl. No. 62/787,041 to Ayyalasomayajula et al., filed Dec. 31, 2018, and entitled "Bloc: CSI-Based Accurate Localization For BLE Tags", and incorporates its disclosure herein by reference in its entirety.

TECHNICAL FIELD

The current subject matter generally relates to data processing, and in particular, determination of location for wireless tags, such as Bluetooth® Low Energy (BLE) tags, using channel state information-based.

BACKGROUND

A significant number of communications devices operate in today's communications systems. Various wireless communication protocols have been developed for determining location (i.e., localization) of such devices. These include WiFi protocols, satellite-based signaling, long term evolution (LTE) systems protocols, passive radio frequency identification (RFID) methods, active RFID methods, Bluetooth® and other protocols. One of the motivations for development of these protocols has been that several devices typically use one or more of the wireless protocols for communication and reusing the communication protocol for localization makes it easy to add on.

Bluetooth Low Energy (BLE) tags have become very popular over the past decade for tracking various applications, devices, etc. in homes, businesses, etc. These tags are used to track objects, navigate people, deliver contextual advertisements, etc. However, the available methods for tracking them are based on signal strength measurements, which tend to be inaccurate, and prone to multipath and dynamic environments.

SUMMARY

In some implementations, the current subject matter relates to a computer implemented method for determining a location of a communication device (e.g., a BLE tag). The method may include receiving data corresponding to a detected transmission of a data packet between a tag device and one or more communication devices in a plurality of communication devices on one or more communication channels; determining at least one of a channel state information and a signal strength associated with the detected transmission on the one or more communication channels for each frequency band in a plurality of frequency bands; determining, based on the determined channel state information, one or more lengths of signal paths corresponding to the detected transmission of the data packet; and selecting a shortest length in the one or more lengths of signal paths across one or more communication devices to determine a location of the tag device.

In some implementations, the current subject matter may include one or more of the following optional features. The tag device and the communication devices may be Bluetooth® low energy devices. Further, the data packet may include at least one of the following: a plurality of zero bits followed by a plurality of one bits, a plurality of one bits followed by a plurality of zero bits, a plurality of zero bits, a plurality of one bits, and any combination thereof. The plurality of zero bits may be a smoothed plurality of zero bits and the plurality of one bits is a plurality smoothed one bits. The channel state information may be determined at at least one of the following: a first frequency (e.g., $f_0$) corresponding to the transmitted smoothed plurality of zero bits, and a second frequency corresponding to the transmitted smoothed plurality of one bits (e.g., $f_1$).

In some implementations, the channel state information determination may also include determining an average of the first and second frequencies. The phase and/or amplitude may be determined based on an angle of arrival of a signal (e.g., $\theta$), corresponding to the detected transmission, at the communication devices. In some implementations, the shortest length may be selected based on the signal strength. The direction of the signal may be determined using the angle of arrival. Further, the shortest length may also be selected using the channel state information determined at at least one of the first frequency, the second frequency, or any combination thereof.

In some implementations, the communication devices may include a master communication device and one or more slave communication devices. The slave communication devices may be configured to listen on the transmission of the data packet between the tag device and the master communication device.

In some implementations, the channel state information determination may also include determining the channel state information for each frequency band in the plurality of frequency bands for each of the communication devices.

In some implementations, the method may also include determining one or more phase offsets for each frequency band in the plurality of frequency bands, and correcting, using the determined phases, the determined a channel state information associated with the detected transmission.

In some implementations, the shortest length may be selected using a spatial distribution of the signal paths corresponding to the detected transmission of the data packet.

In some implementations, the method may further include determining an angular distribution of the one or more signal paths corresponding to the detected transmission of the data packet. The location of the tag device is determined using one or more values corresponding to the determined angular distribution.

Implementations of the current subject matter can include, but are not limited to, systems and methods consistent including one or more features are described as well as articles that comprise a tangibly embodied machine-readable medium operable to cause one or more machines (e.g., computers, etc.) to result in operations described herein. Similarly, computer systems are also described that may include one or more processors and one or more memories coupled to the one or more processors. A memory, which can include a computer-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including but not limited to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the rendering of cortical bone using ultrasound, it should be readily understood that such features are not intended to be limiting. The claims that follow this disclosure are intended to define the scope of the protected subject matter.

BRIEF DESCRIPTION OF THE DRAWINGS

The accompanying drawings, which are incorporated in and constitute a part of this specification, show certain aspects of the subject matter disclosed herein and, together with the description, help explain some of the principles associated with the disclosed implementations. In the drawings.

FIGS. 10b-c illustrate a location of the tag and one or more peaks (local maxima) in the likelihood distribution over space, as determined by the process shown in FIG. 10a.

DETAILED DESCRIPTION

Figure 1:
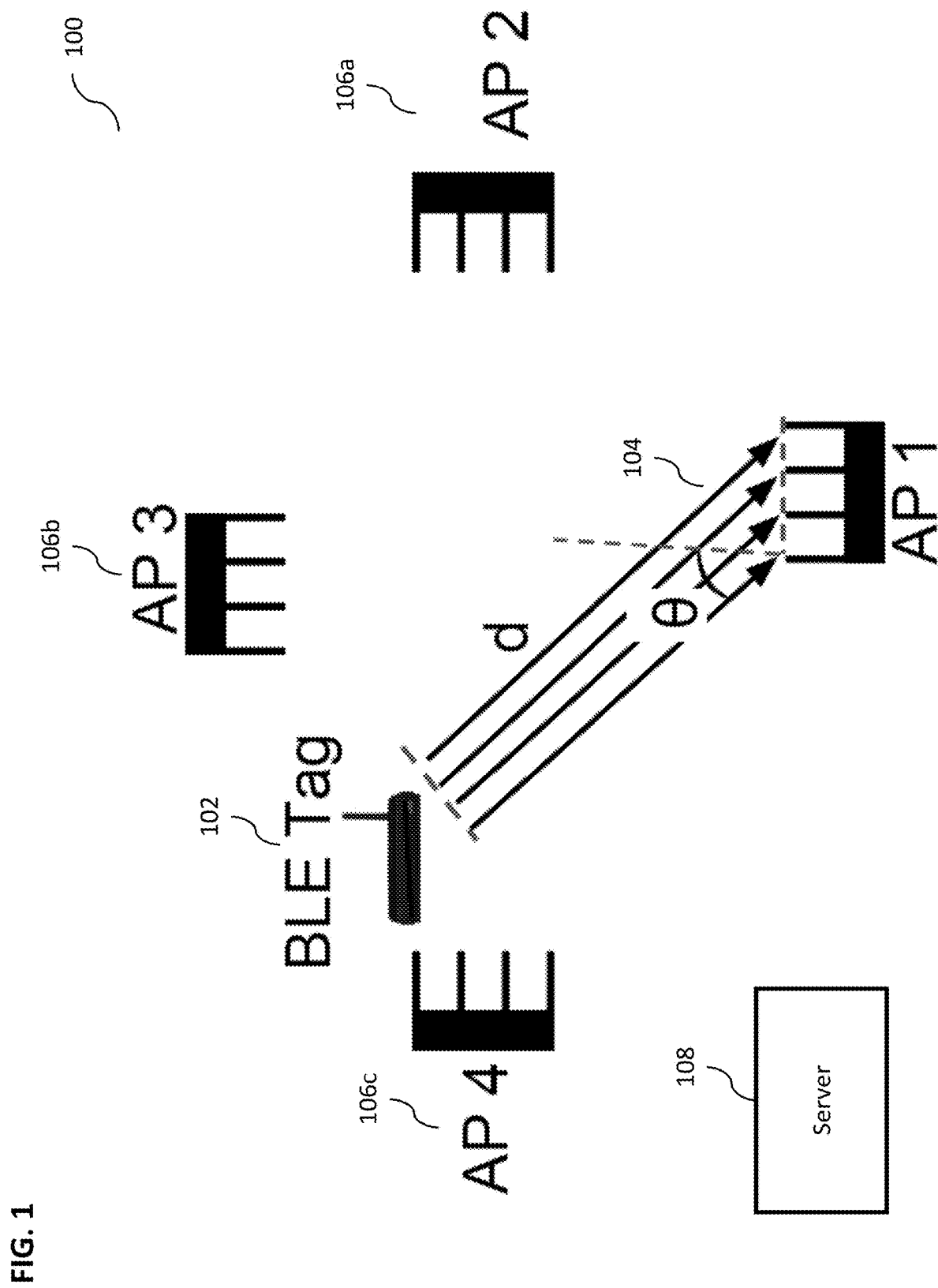
FIG. 1 illustrates an exemplary BLE device location determination system, according to some implementations of the current subject matter.

One or more implementations of the current subject matter relate to methods, systems, articles of manufacture, and the like that may, among other possible advantages, provide BLE-compatible localization algorithms implementing channel state information (CSI), which may include one or both signal strength and signal phase.

Modern communications systems allow users to communicate with and/or to locate various objects. Bluetooth® Low Energy (BLE) protocol may be used for this purpose of at least the following reasons: (a) BLE devices may communicate with off-the-shelf wireless devices and access points with a range of approximately 10 m, (b) BLE technology may enable communication at low power. BLE devices may be used to track pets, find lost objects (e.g., keys), enable navigation in shopping malls, and automate operation on factory floors. Localization, as enabled by the BLE tags, may be used in several applications, including, for example, asset tracking, contextual advertisements, etc. Conventional localization algorithms for BLE typically rely on measuring strength of a received signal and using it as a proxy for location. However, relying on signal strength alone may be problematic because: (a) accuracy achieved by modeling signal strength is often low (several m), (b) received signal strength indicator (RSSI) estimates are not robust to multipath which commonly exists in real-world environments, and, (c) RSSI modeling is prone to errors when the communication environment is dynamic.

In some implementations, the current subject matter provides a BLE-based localization system that may implement channel state information (CSI) based algorithm that may use one or both signal strength and signal phase to estimate angle and/or distance between the transmitter and the receiver. The current subject matter's system may be further configured to address phase measurement, bandwidth, and multipath resolution issues that are typically associated with conventional BLE systems.

With regard to phase measurement, in Wi-Fi, the wireless channel is measured by sending known symbols simultaneously at multiple fixed narrowband frequencies (e.g., orthogonal frequency division multiplexing (OFDM) subcarriers) and measuring the corresponding received signal. In contrast, BLE uses Gaussian Frequency Shift Keying modulation and as a result, the information is encoded as the frequency of the signal. Specifically, in BLE, the bits 0 and 1 correspond to two different frequencies (e.g., $f_0$ and $f_1$)

within a 2 MHz band. When the transmitter transmits bit 0, the transmission frequency is shifted to $f_0$ in the frequency domain. Similarly, for bit 1, the transmission frequency is moved to $f_1$. Further, a Gaussian filter is applied to the bits to ensure smooth frequency switching. Thus, the signal has continuously varying frequency, making it challenging for conventional BLE systems to measure the wireless channel in the first place.

Concerning bandwidth, CSI-based algorithms for Wi-Fi-based positioning rely on wireless channels across wideband frequencies available in Wi-Fi to identify the direct path and weed out the multipath. The smallest band available on Wi-Fi is 20 MHz wide and the largest band is 160 MHz wide. In contrast, BLE channels are 2 MHz wide, at least one order of magnitude narrower than Wi-Fi. Since larger bandwidths help localization systems to separate multipath that is close to each other, the bandwidth limitation hampers conventional BLE systems' ability to deal with multipath.

Lastly, for multipath resolution, in conventional BLE systems, BLE signals reflect off various reflectors (e.g., walls, screens, furniture, etc.) in an environment. Some of these reflections might actually be stronger than the line-of-sight path because of obstructions. This makes it difficult for conventional BLE systems to isolate the direct path and ignore reflections so as to avoid large errors in localization.

In some implementations, to address the above challenges, the current subject matter relates to a BLE location determination or localization system that may enable close range (e.g., sub-meter) localization of one or more BLE devices using a CSI-based localization algorithm, whereby one or both signal strength and/or signal phase may be used to enable high accuracy and reliable localization.

FIG. 1 illustrates an exemplary BLE device location determination system 100, according to some implementations of the current subject matter. The system 100 may include one or more target BLE devices or tags 102 (e.g., any device that may be enabled with a BLE and/or Bluetooth® technology), one or more anchor point devices 104, 106 (a, b, c), and one or more servers 108. The devices 102, 104, 106, may be configured to be communicatively coupled using Bluetooth® and/or BLE communications capabilities. The server 108 may be communicatively coupled to one or more devices 102, 104, and/or 106 using any wireless and/or wired communications networks. In some exemplary implementations, the device 104 may be selected as a primary anchor point or a "master" and devices 106 may be used a "slave" points for execution of the location determination of the device 102.

In some implementations, the system 100 may be configured to implement the existing BLE protocols (without making any changes to it) as well as existing BLE enabled devices. For example, the current subject matter's processes may be backwards compatible and be able to work with off-the-shelf devices. Moreover, as stated above the system 100 may be configured to achieve sub-meter localization accuracy for BLE target devices 102.

As shown in FIG. 1, the anchor devices 104 and 106 (which may be similar to BLE beacons) may be deployed in system 100. The BLE target device 102 may be configured to connect to one of the master anchor points 104. The other anchor points 106 may be configured to passively "listen" for communication between the tag device 102 and the anchor device 104. By "listening", the devices 106 may be configured to measure the CSI (e.g., one or both amplitude and phase) for transmissions from tag 102 to the anchor device 104 and for the anchor 104 to the tag 102. Once the data is collected, all the anchor points 104, 106 may be configured to communicate the data to the central server 108 to execute estimation of the location of the tag 102.

Figure 2:
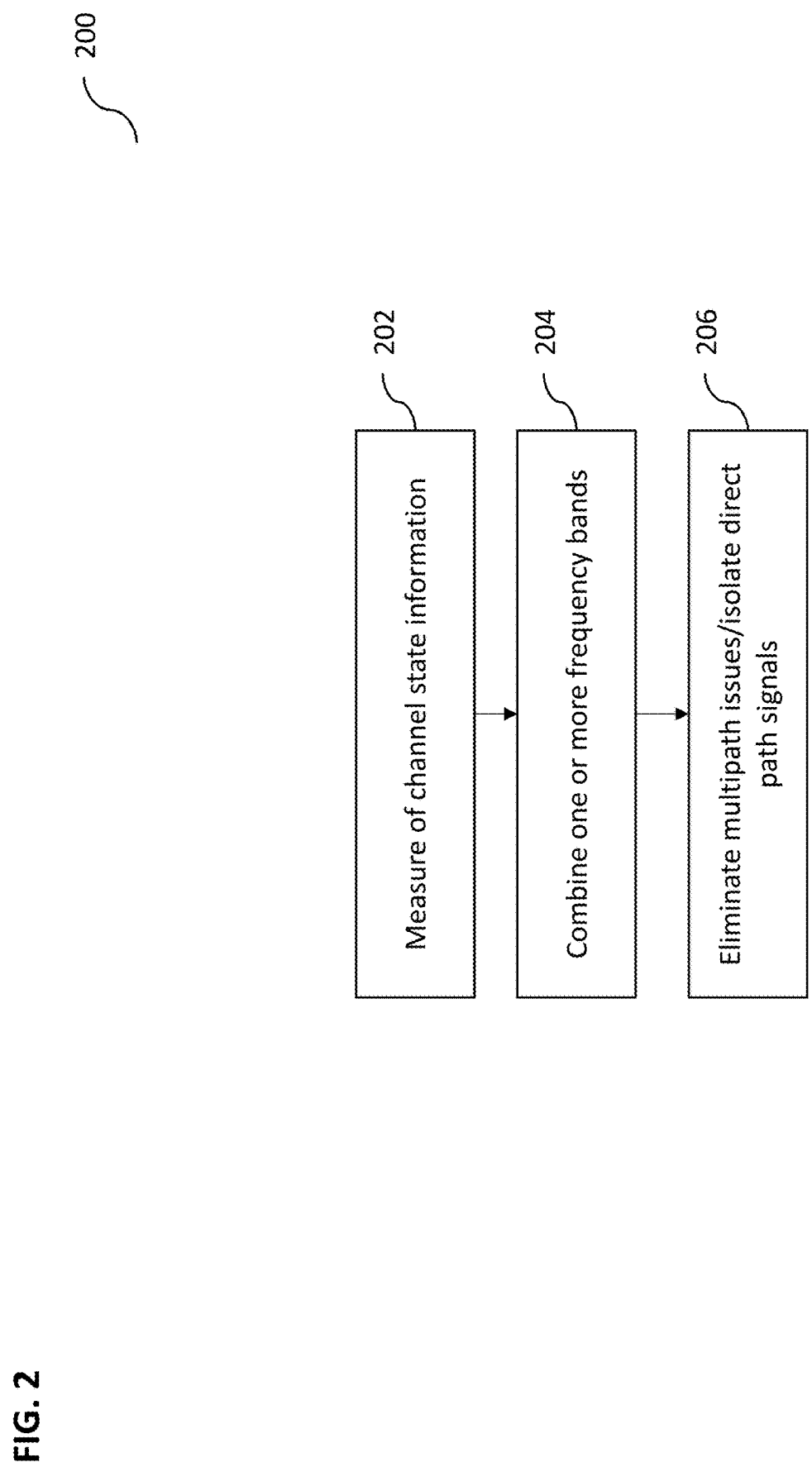
FIG. 2 illustrates an exemplary location determination or localization process that may be performed by the system shown in FIG. 1, according to some implementations of the current subject matter.

To estimate location of the tag 102, the system 100 may be configured to execute a location determination or localization process 200 shown in FIG. 2. Referring to FIG. 2, the process 200 may be configured to include measurement of channel state information (at 202), combining one or more frequency bands (at 204), and elimination of multipath issues/isolation of direct path signals (at 206). To measure channel state information (CSI), at 202, because frequency of transmission in BLE is constantly varying, the current subject matter may be configured to implement use of localization packets having long sequences of 0s, followed by long sequences of 1s. By transmitting a long sequence of 0s, transmissions of signals may be configured to converge to frequency $f_0$ and measure channel at frequency $f_0$ (as shown, for example in FIG. 4). Similarly, by sending a long sequence of 1s, the transmission of signals may be configured to converge to frequency $f_1$. The CSI may be measured at each of these frequencies and then processed in subsequent steps to obtain a location estimate.

Figure 3:
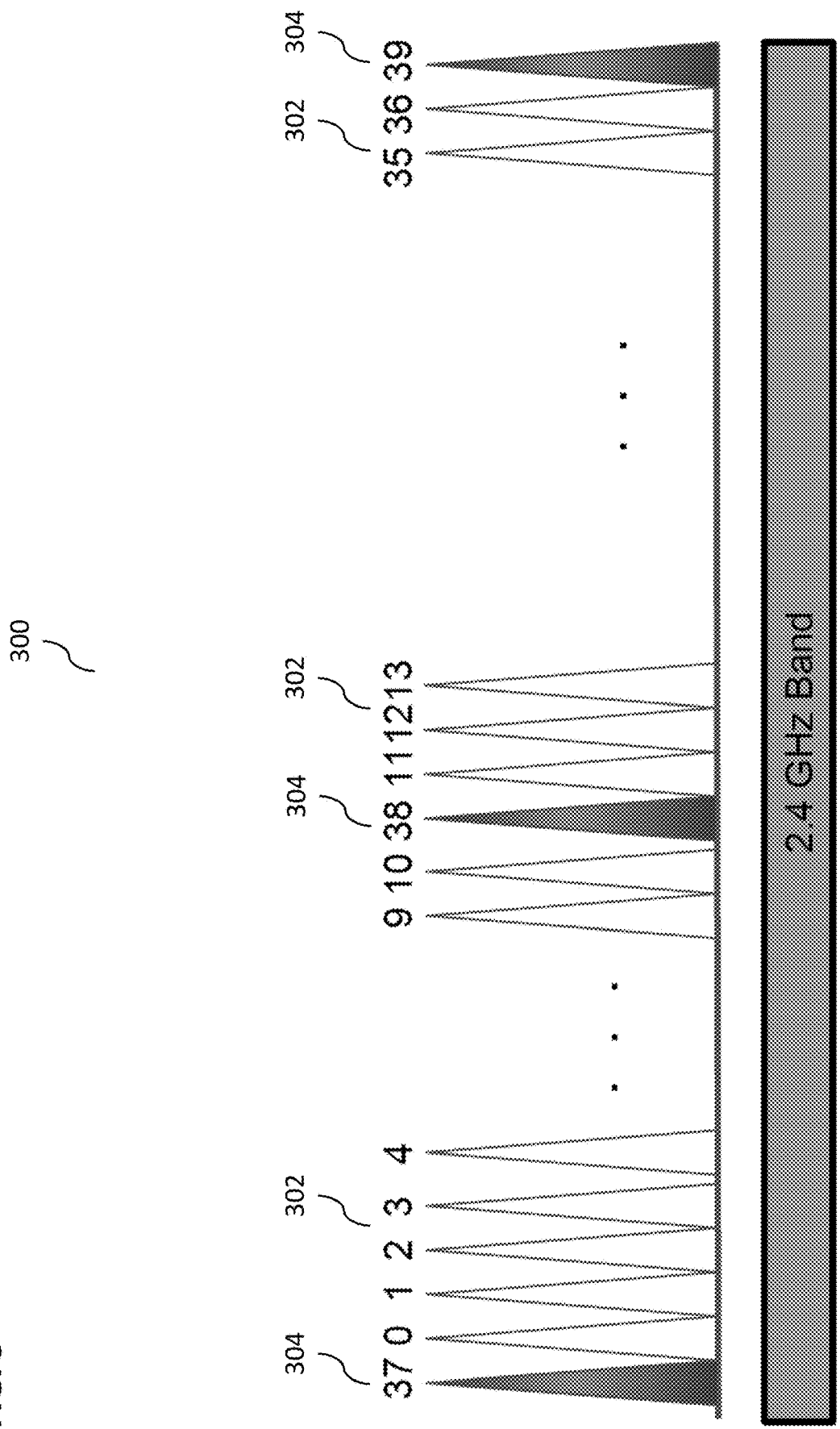
FIG. 3 illustrates BLE frequency bands.

To combine one or more frequency bands, at 204, the system 100 may be configured to combine channel information across one or more different channels (e.g., 37 BLE frequency bands 302, as shown in FIG. 3 (excluding advertising bands 304)) and hence, emulate a large frequency bandwidth. Further, as will be discussed below, the system 100 may be configured to eliminate a random phase offset per frequency generated by a transmitter and/or a receiver switching of frequency bands.

Referring back to FIG. 2, to execute elimination of multipath and/or isolation of the direct path from the transmitter to the receiver, at 206, the system 100 may be configured to select a shortest path, since the direct path may be configured to travel the least distance. By using a wideband frequency, the system 100 may be configured to measure the length of the paths to determine the direct path. In some exemplary, experimental implementations, the current subject matter system may be configured to achieve a localization accuracy of 86 cm in a multipath-rich environment (in contrast to conventional system's accuracy of 2.42 m), perform bandwidth enhancement from 2 MHz to 80 MHz band to reduce a median error from 1.6 m to 86 cm, improve localization accuracy by a factor of 2.

The following is a discussion Bluetooth® Low Energy protocol, which may be helpful for the purposes of understanding some of the details of the current subject matter's process. Bluetooth® Low Energy (BLE) is designed for low power devices to communicate information over the ISM band (2.4 GHz-2.48 GHz). The spectrum available for BLE is 80 MHz. As shown in FIG. 3, this bandwidth is divided into 40 frequency bands 300, each of which is 2 MHz wide. BLE protocol operates in two modes: broadcast mode and connected mode. The broadcast mode is used by devices to advertise their presence on the medium and contains information about the device, its type, manufacturer, etc. The broadcast mode operates on 3 of the 40 available bands for Bluetooth® (i.e., bands 37-39 304). Upon receiving one of the advertised beacons on the broadcast bands, another device (master) can initiate a connection to this device (slave). During the connection establishment process, the master and the slave devices agree on several connection parameters, one of which is the frequency hop distance ($f_{hop}$).

Once the connection is established, the master and slave hop through the 37 non-broadcast bands (i.e., bands 302), jumping by $f_{hop}$ bands every time a packet is exchanged between the master and the slave. Thus, if the first transmission occurs at channel 10, and $f_{hop}$=3, then the next transmission will be at channel 13. If $f_{cur}$ and $f_{next}$ denote the bands used for current and next transmissions respectively, then $f_{next}$=$f_{cur}$+$f_{hop}$ mod 37. Since the total number of bands is prime (37), the transmissions will hop through all available bands before repeating a band that has been used before.

In order to perform wireless localization of a device, properties of wireless channels (e.g., amplitude, phase, etc.) from a transmitter to one or more receivers are measured and converted to a location estimate for the transmitter. Consider a signal with wavelength, λ, travelling in free space from a transmitter to a receiver separated by distance d, then, the wireless channel, h, measured at the receiver can be modeled as:

$$h = \frac{A}{d} e^{-t \frac{2\pi d}{\lambda}} \quad (1)$$

In the above equation, A is the attenuation constant and i=$\sqrt{-1}$. When the signal is travelling along multiple paths, the wireless channel obtained is the sum of the channel along each of these paths:

$$h = \sum_{i}^{N} \frac{A_i}{d_i} e^{-t \frac{2\pi d_i}{\lambda}} \quad (2)$$

where N is the number of paths and $d_i$ is the length of the $i^{th}$ path.

In RSSI-based localization, an absolute value of the wireless channel, |h|, is measured. As shown in equation (1) above, for a single path, the absolute value of the channel directly depends on the distance. However, when there are multiple paths (as shown in equation 2), the absolute value of the channel is determined by how the channels along different paths combine. They can combine in-phase (making the channel amplitude high) or out-of-phase (completely canceling each other out), creating huge variations in amplitude for small changes in positions. Thus, RSSI based systems typically suffer in the presence of multipath. Some RSSI-based systems use fingerprinting-based approaches, where the RSSI at different locations is manually measured and these measurements are used to guide the predictions. However, any changes in the multipath characteristics of the environment (e.g., moving furniture around) will require the system to do fingerprinting again, involving massive efforts.

Figure 5:
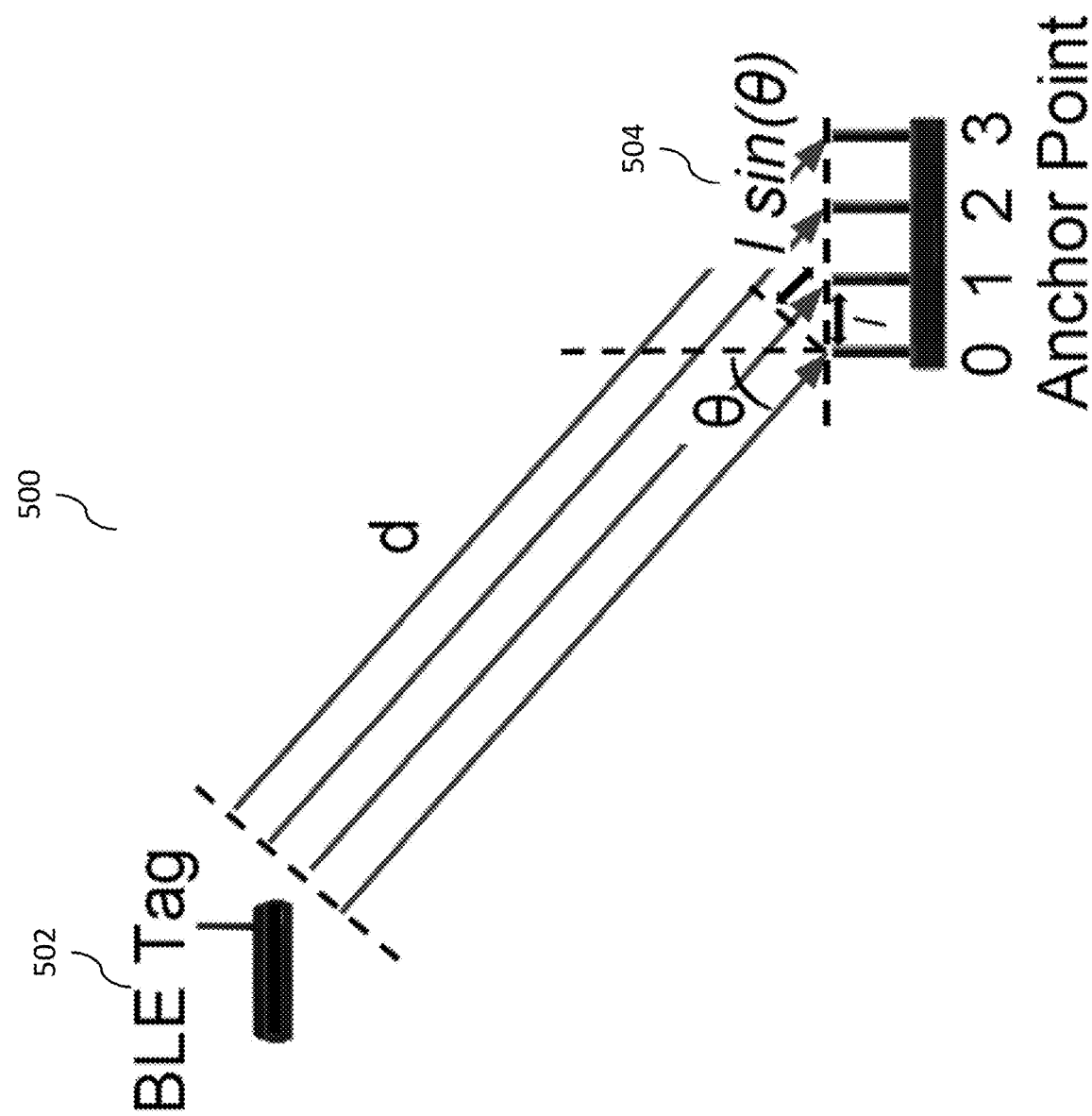
FIG. 5 illustrates an exemplary system for determination of an angle of arrival between a target BLE tag or device and an anchor device, according to some implementations of the current subject matter.

To measure angles, when both signal strength and phase of a channel are available, a set of channel measurements at multiple antennas can be used to measure an angle of arrival of the signal. FIG. 5 illustrates an exemplary system 500 for determination of an angle of arrival between a target BLE tag or device 502 and an anchor device 504. The device 504 may include a linear antenna array with N antennas. The target device 502 is placed at an angle θ with respect to the antenna array of the device 504, where an antenna i measures channel $h_i$. A distance from the target to antenna i is larger than the distance from the target to antenna 0 by il sin θ, where l is the separation between adjacent antennas. Thus, the channel to antenna i incurs an additional phase of $$\frac{-2\pi i l \sin\theta}{\lambda}$$

based on equation (1) above, i.e., $$h_i = h_0 e^{-t \frac{2\pi i l \sin\theta}{\lambda}}.$$

This transform can be reversed to identify the likelihood of transmission from each direction as follows:

$$Pa(\theta) = \left| \sum_{i=1}^{N} h_i e^{t \frac{2\pi i l \sin\theta}{\lambda}} \right| \quad (3)$$

where Pa(θ) is the likelihood of the signal received from direction θ. Even if there are multiple paths (direct and reflected), the signal along different directions can be separated out based on the direction that the signals arrive from.

To measure distance between a transmitter and a receiver, multiple frequencies can be used. Assuming that channels are measured at K different frequencies such that fi=$f_0$+iδf. Then, using equation (1) above, the channel measured on frequency $f_i$, $$h_{fi} = h_0 e^{-t \frac{2\pi i (f_0 + \delta f d)}{c}},$$

where c is the speed of light. Thus, the phase of the channels is a linear function of the distance. As such, by comparing phases of the channels measured at multiple frequencies, the distance between a transmitter and a receiver can be estimated. Similar to equation (3), given channel measurements at different frequencies, the likelihood of the signal coming from each distance, Pt(d), can be determined as follows:

$$Pt(d) = \left| \sum_{i=1}^{K} h_i e^{t \frac{2\pi i \delta f d}{c}} \right| \quad (4)$$

Both multiple antennas and multiple frequencies can be combined to obtain a 2-d function, P(θ, d), that can be used to determine a likelihood the signal coming from direction θ and distance d:

$$p(\theta, d) = \left| \sum_{i=1}^{K} h_{ik} e^{t \frac{2\pi i l \sin\theta f_0}{c}} e^{t \frac{2\pi k \delta f d}{c}} \right| \quad (5)$$

where $h_{ik}$, is the wireless channel measured on antenna i and frequency k (where in a joint case, d is the distance measured from antenna 0).

Figure 4:
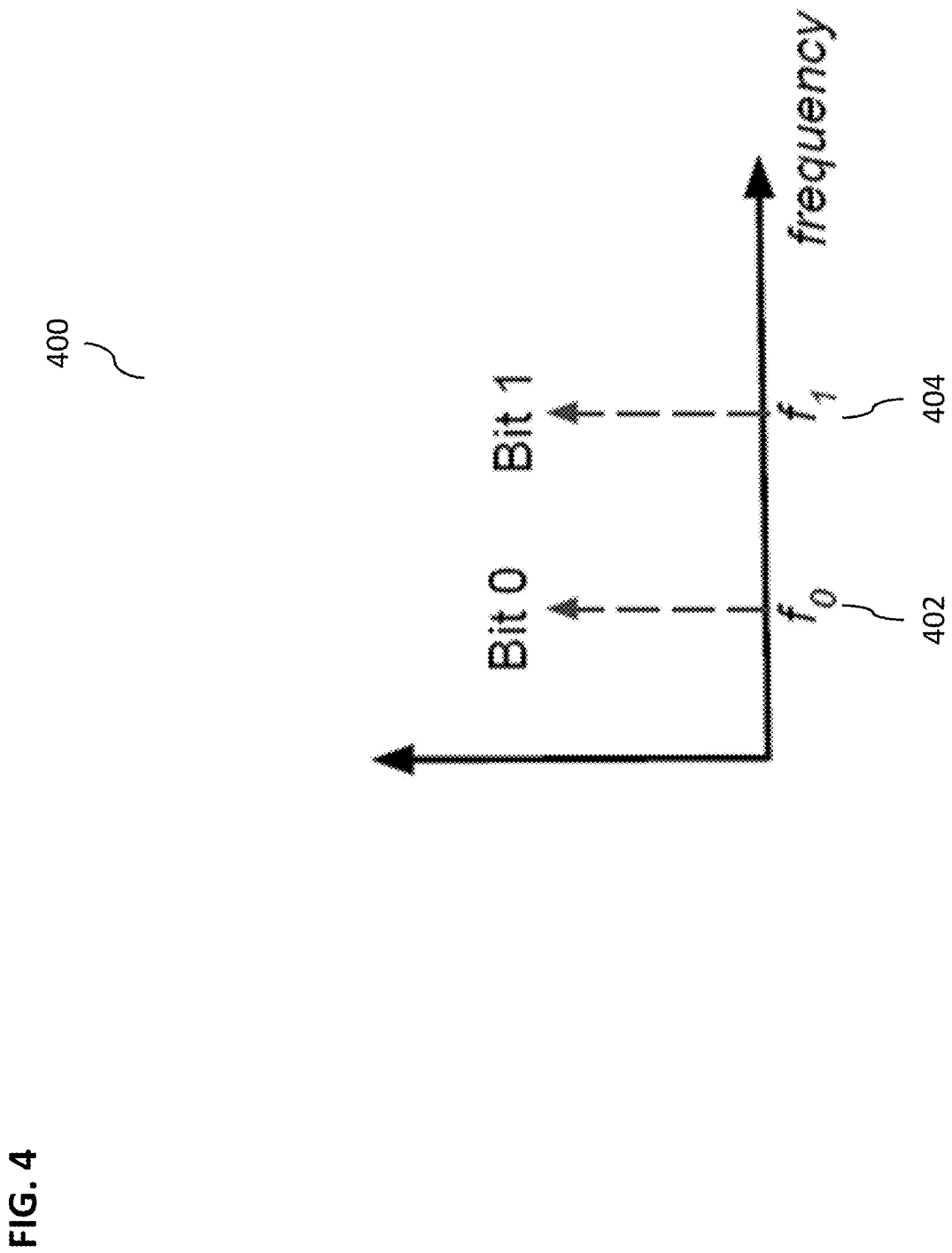
FIG. 4 illustrates exemplary frequencies for transmissions of various bits in a BLE environment, according to some implementations of the current subject matter.

Referring back to FIGS. 1-2, measurement of channel state information may include extracting or measuring of phase information. The phase information may be used to identify an angle of arrival of the signal (e.g., using multiple antennas) and/or the distance between the tag 102 and the anchor 104 (e.g., using multiple frequency channels). In some implementations, measurement of phase may occur at the PHY layer and may involve the PHY protocol. As part of the PHY protocol, BLE protocol may use Gaussian frequency shift keying (GFSK) modulation for transmitting data. In existing frequency shift keying (FSK) protocols, each symbol may correspond to a frequency. For example, when using just two symbols (e.g., bit 1 and bit 0, as shown in FIG. 4), there are two frequencies (e.g., $f_1$ and $f_0$, as shown in FIG. 4) that correspond to the symbols. Thus, if the transmitter transmits bit 1, it transmits at frequency $f_1$ and if the transmitter transmits bit 0, it transmits at frequency $f_0$. However, to avoid frequent jumps in frequency (and out-of-band noise), BLE protocol uses a Gaussian filter on the bits. As a result, the bits are smoothed versions of 0 and 1 and hence, the frequency transitions are continuous, as shown in FIG. 6a (whereby original bits are shown by curve 602 and their smoothed versions by-the curve 604). This continuous variation in bits (and hence, frequency) implies that the frequency of transmission may not be stable and may prevent accurate channel measurements.

Figure 6B:
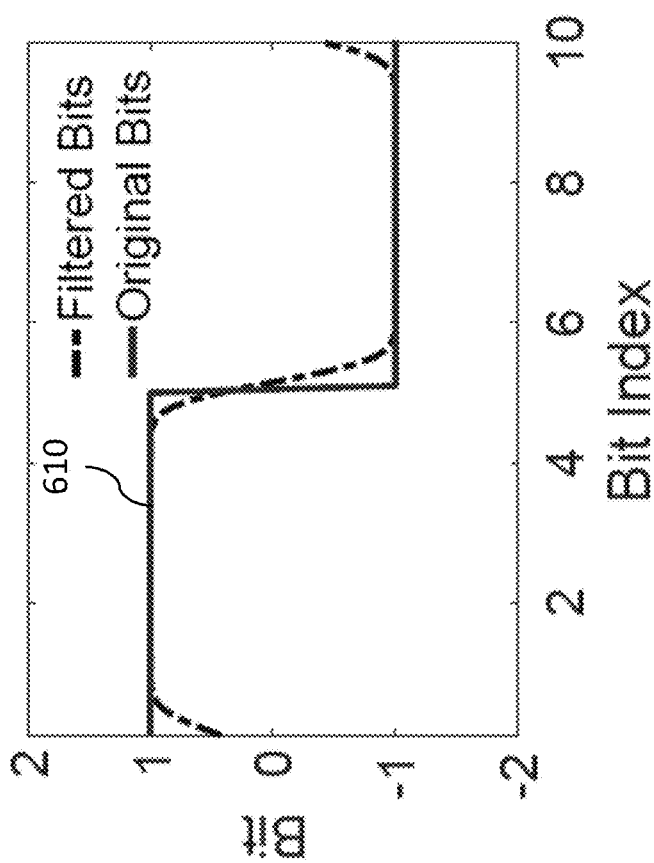
FIG. 6b illustrates an exemplary plot showing stable frequency being achieved by the process shown in FIG. 2, according to some implementations of the current subject matter.
Figure 6A:
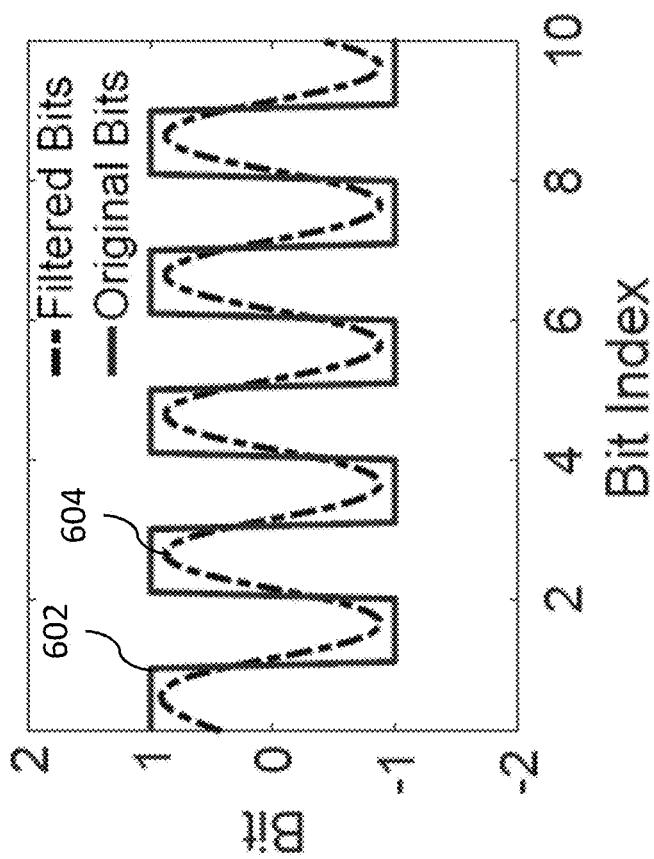
FIG. 6a illustrates an exemplary application of a Gaussian filter to transmitted bits in a BLE environment.

FIG. 6b illustrates an exemplary plot 610 showing stable frequency achieved by the process 200 shown in FIG. 2, according to some implementations of the current subject matter. In particular, to achieve such stable frequency and overcome the above problems, the system 100 may be configured to construct BLE data packets using long sequences of bit 0 followed by long sequences of bit 1 (alternatively, or in addition to, there can be a plurality of 1 bits followed by a plurality of 0 bits, a plurality of 0 bits, a plurality of 1 bits, and any combination thereof). Long sequences of bit 0 may be transmitted at frequency value, $f_0$, thereby allowing measurement of the wireless channel at $f_0$, $h_0$. The wireless channel may be measured using a ratio of the received symbol to the transmitted symbol. If the transmitted symbol is $x_0$ and it is received as $y_0$ at the receiver, the channel $h_0$ at frequency $f_0$ may be measured as:

$$h_0 = \frac{y0}{x0}.$$

Similarly, channel $h_1$ at frequency $f_1$ may be measured by transmitting a sequence of 1-bits. As shown in FIG. 6b, sequences of 5 0-bits may be followed by 5 1-bits and may lead to substantially constant frequency for significant chunks of time. These stable transmissions may then be used to measure a phase of the channel at these frequencies.

Referring back to FIGS. 1-2, once complex-valued wireless channel for a BLE band have been determined, the process 200 may be configured to determine a location of the device 102. The following provides some notation for the description below. The complex-valued channel, measured at anchor i, antenna j and frequency band f may be denoted by $h^f_{ij}$. It should be noted that BLE may allow multiple frequency bands. As mentioned before, two channel values may be measured for each band. These two values may be combined into a single value per band by averaging channel amplitude and channel phase separately and combining them into a single channel value. This channel value may be assumed to be the wireless channel at the center frequency of the band. Further, the amplitude and phase of $h^f_{ij}$ may be denoted as $|h^f_{ij}|$ and $<h^f_{ij}$ respectively. Finally, there may be a total of I anchors, with J antennas per anchor, whereby $f \in \{f_k | k=1 \ldots K\}$.

In some implementations, one of the benefits of using channel phase for location determination is an additional ability to resolve multipath issues. By using channel phase, one may identify the delay of individual paths (e.g., one or both direct and reflected) and hence, select the shortest paths to be the direct paths. However, the ability to separate out different paths may depend on available bandwidth. If the closest separation between paths is $\delta d$, then the frequency bandwidth, BW required to identify them may be determined by:

$$BW \geq \frac{c}{\delta d} \quad (6)$$

where c is the speed of light.

Thus, for BLE's effective bandwidth of 1 MHz, the corresponding distance may be 300 m. This is typically larger than distances in indoor settings and hence, any paths that are closer to each other than 300 m might not be distinguishable from each other. Hence, this bandwidth might not be sufficient to resolve indoor multipath. To resolve this issue, BLE frequency hopping may be used. In particular, while BLE has effective bandwidth of 1 MHz, it has frequency hopping built in, which may change frequency of transmission after every packet. For example, if the current frequency band is $k_1$ (with frequency $f_{k1}$, then for the next packet, the transmission may happen in frequency band, $k_1+k_{hop}$ mod 37, where $k_{hop}$ is the parameter specific to a connection and 37 is the total number of BLE frequency bands possible. Since 37 is a prime number, $k_1+k_{hop}$ may be guaranteed to go through all frequency bands for all values of $k_{hop}$. Thus, the current subject matter may be configured to measure and combine the wireless channel information across multiple frequency bands to "span" a total of 80 MHz (i.e., the total span of the BLE frequency bands, as shown in FIG. 3).

In some implementations, to achieve a large bandwidth and improve multipath resolution, the current subject matter may be configured to measure channel data on all BLE frequency bands. In particular, the current subject matter may measure channels on multiple antennas per anchor and on different frequency bands. Further, the current subject matter may be configured to resolve an issue of a phase offset that may be generated by an oscillator of a BLE device. Every BLE device has a local oscillator responsible for generating the signals. This oscillator may be used to tune the system to different frequencies. However, every time the oscillator is used to tune the frequency, it may incurs a random phase offset, thereby causing a lack of phase synchronization between the transmitter and receiver. For example, if the transmitter has a phase offset, $\phi_T$ and the receiver has a phase offset, $\phi_R$, the channel measured at the receiver is given by $\hat{h}^f_{ij} = h^f_{ij} e^{\phi_T - \phi_R}$. This phase offset $\phi_T - \phi_R$) is random and changes per frequency switch. Thus, the phase of the channel measurements may be completely distorted and hence, cannot be used for localization purposes directly.

Figure 7:
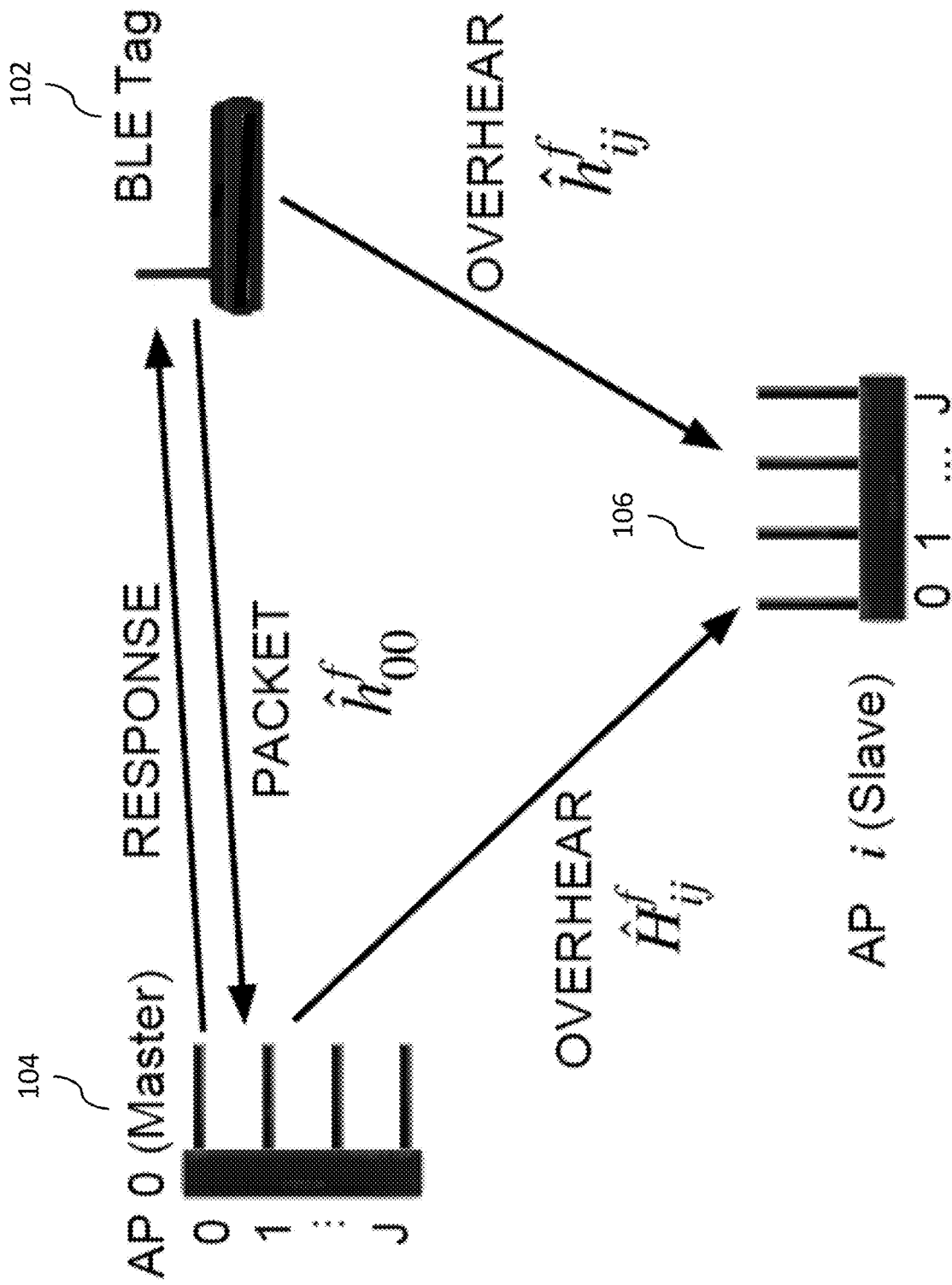
FIG. 7 illustrates an exemplary system for two-way exchange of data packets, according to some implementations of the current subject matter.

To resolve the phase offset issue, the system 100 may be configured to rely on a feature of the BLE protocol, whereby during one communication period, a master (e.g., device 104) and a slave (e.g., device 106) may be configured to communicate with each other. In particular, there is a two-way exchange of data packets, as shown in FIG. 7. In that regard, by designating one of the devices (e.g., device 104) as the master device, the system 100 may be configured to allow it to exchange packets with the target BLE tag 102. All other anchors 106 may be configured to measure channel state information between the target device 102 to themselves and from the master anchor 104 to themselves 104. The master anchor 104 can be anchor 0, i.e., i=0. Then, the master anchor 104 i may measure channels $\hat{h}^f_{ij}$ from the target device 102 to itself and measure channels, $\hat{H}^f_{ij}$ from antenna 0 on the master device 104 to itself. Then, $\hat{h}^f_{ij}\hat{H}^{f}_{i0*}\hat{h}^{f*}_{00}$ is independent of any random phase offsets, where $(.)^*$ may denote a complex conjugate operation. To illustrate this, the phase offset of the target tag may be denoted by $\phi^T$ and the phase offset of the i-th anchor by $\phi_{Ri}$. Further, $\hat{H}^f_{ij}$ may be the true physical wireless channel from antenna 0 on anchor 0 to antenna j on anchor i, measured at frequency f. As such, $$\hat{h}_{ij}^f = h_{ij}^f e^{\phi T - Ri} \quad (7)$$

$$\hat{h}_{00}^f = h_{00}^f e^{\phi T - \phi R0} \quad (8)$$

$$\hat{H}_{i0}^f = H_{i0}^f e^{\phi R0 - \phi Ri} \quad (9)$$

$$\Longrightarrow \hat{h}_{ij}^f \hat{H}_{i0}^{f*} \hat{h}_{00}^{f*} = h_{ij}^f H_{i0}^{f*} h_{00}^{f*} \quad (10)$$

As such in equation (10) above, the quantity $\hat{h}^f_{ij}\hat{H}^{f}_{i0}*\hat{h}^{f*}_{00}$ may be independent of phase offsets and may depend only on the underlying physical wireless channels. Equation (10) further includes the following three terms of a channel. First one may include from the tag 102 to the anchor i (slave anchor 106), as measured by "overhearing" packet transmission from the tag 102 at frequency f, $\hat{h}^f_{ij}$. Second one may be from the anchor 0 (master anchor 104) to the anchor i (slave anchor 106) as measured by "overhearing" packet response from the master anchor 104 to the tag 102 at frequency f, $\hat{h}^f_{i0}$. The third one may be from the tag 102 to the master anchor 104 at frequency f, $\hat{h}^f_{00}$. In some implementation, these channel estimates may be provided to the central server 108 for the purposes of correcting phase offsets. In particular, assuming $\alpha^f_{ij}=\hat{h}^f_{ij}\hat{H}^{f*}_{i0}*\hat{h}^{f*}_{00}$ (hereinafter, for ease of illustration, $\alpha^f_{ij}$ may be referred to as channels to be corrected or corrected channels). The corrected channels may be free from any random phase distortions caused due to frequency switching. This may be achieved based on an observation that both the anchor 104 and the tag 102 may transmit data during a communication period.

In some implementations, upon determining the corrected channels, the system 100 may be configured to determine or estimate tag location probabilities. For that, the corrected channels, $\alpha^f_{ij}$, may be rewritten in their expanded geometric form. In the equations below, the term $$d\frac{lm}{ij}$$

may be used to denote a distance from antenna j on anchor i to antenna m on anchor l. Further, $$d\frac{lm}{ij}$$

may represent a distance from the tag to antenna j on anchor i.

$$\alpha^f_{ij} = \hat{h}^f_{ij}\hat{H}^{f*}_{i0}\hat{h}^{f*}_{00} \quad (11)$$

$$= h^f_{ij}H^{f*}_{i0}h^{f*}_{00} \quad (12)$$

$$= e^{-i d^{ij}_T \frac{2\pi f}{c}} e^{i d^{i0}_{00} \frac{2\pi f}{c}} e^{i d^{00}_T \frac{2\pi f}{c}} \quad (13)$$

$$= e^{-i \frac{2\pi f}{c}(d^{ij}_T - d^{i0}_{00} - d^{00}_T)} \quad (14)$$

The determination in equation (14) may have an effect on angle and distance measurements. In particular, as shown in equation (3) above, the relative phase measured by the different antennas on a single anchor point may determine the angle-of-arrival of the incoming signal (e.g., the direction of the signal from the target tag). Thus, by adding a constant phase to the channel measurements on all the antennas of a single anchor point, the angle distribution does not change. Multiplying the channels on all antennas on an anchor point by the same conjugate channel values, the same phase measurements may be added to all antennas. Thus, the angle distribution of the received signal may be computed using the corrected channels, $\alpha$, directly. Thus, the true channels(h) may be replaced by corrected channels ($\alpha$) in equation (3) above to derive an angular distribution of received signal at anchor i as follows:

$$Pa_i(\theta) = \left| \sum_{j=1}^{J} \alpha^f_{ij} e^{i\frac{2\pi j l \sin\theta}{\lambda}} \right| \quad (15)$$

Figure 8A:
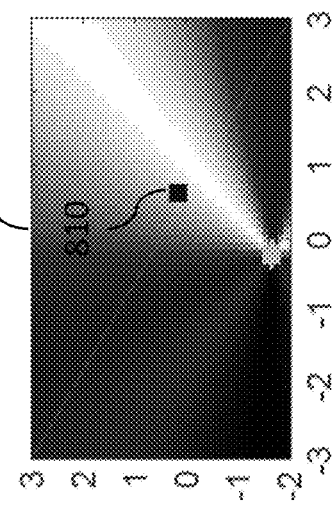
FIG. 8a illustrates an exemplary sample distribution mapped over a 2D space, according to some implementations of the current subject matter.

The distribution in equation (15) may be used to determine information about the angle of arrival of the signal (as well as its multipath reflections). FIG. 8*a* illustrates an exemplary sample distribution 802 mapped over a 2D space (the actual location of a source is show at 810).

As stated above, calculations in equation (14) may affect distance measurements as well. It should be noted that $$d\frac{i0}{00}$$

is a fixed-distance that may be known a priori because the distance between anchor i and anchor 0 may be measured one-time during deployment. Equation (14) shows that the corrected channel may include information about relative distances, e.g., distances measured with respect to anchor 0, antenna 0 (e.g., $$d\frac{ij}{T} - d\frac{00}{T}).$$

As shown in equation (4), channel measurements at multiple frequencies may be used to extract the distance information. The distance in equation (4) may be replaced by the relative distance and the channels by the corrected channels, $\alpha$. The likelihood of the signal received at antenna j on anchor i coming from a relative distance $$d\frac{ij}{T} - d\frac{00}{T}$$

may be determined as follows, $$Pt_{ij}(d^{ij}_T - d^{00}_T) = \left| \sum_{k=1}^{K} \alpha^{f_k}_{ij} e^{i\frac{2\pi f_k}{c}(d^{ij}_T - d^{00}_T - d^{i0}_{00})} \right| \quad (16)$$

Figure 8B:
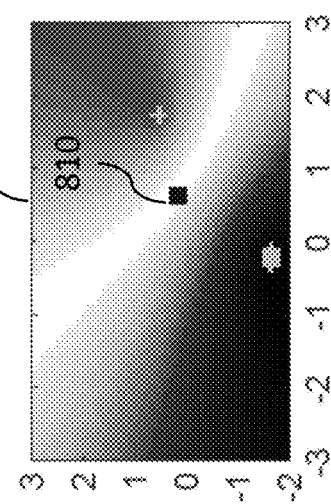
FIG. 8b illustrates another exemplary sample distribution mapped over the 2D space, according to some implementations of the current subject matter.

FIG. 8*b* illustrates an exemplary sample distribution 804 (as determined in accordance with equation (16)) mapped over the 2D space. Because relative distances are being measured as opposed to absolute distances, the shape of the high probability region looks like a hyperbola.

In some implementations, a joint distribution over distance and angles with respect to each anchor may be determined by a combination of equations (15) and (16). The joint distribution may be denoted as $P_i$ for the i-th anchor and expressed as follows:

$$P_i(d_T^{i0} - d_{00}^T, \theta) = \left| \sum_{j=1}^{J} \sum_{k=i}^{K} \alpha_{ij}^{f_k} e^{t\frac{2\pi f_k}{c}(d_T^{ij} - d_T^{00} - d_{00}^{i0})} e^{t\frac{2\pi jl\sin\theta f_k}{c}} \right| \quad (17)$$

Figure 8C:
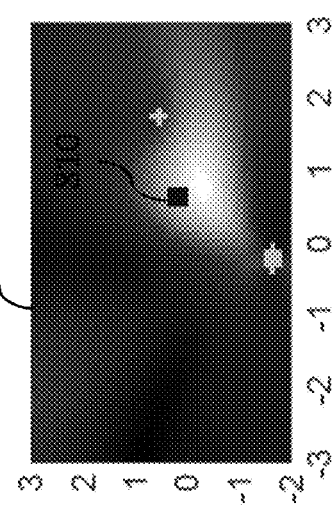
FIG. 8c illustrates an exemplary sample distribution mapped onto the 2-D Cartesian coordinates by a simple change of coordinates, according to some implementations of the current subject matter.

FIG. 8c illustrates an exemplary sample distribution 806 (as determined in accordance with equation (17)) mapped onto the 2-D Cartesian coordinates by a simple change of coordinates. As shown in FIG. 8c, and equation (17), a likelihood of the signal originating from every point in space may be determined, which may be used to determine the likelihood of the signal from the perspective of every anchor in the system 100. The likelihood obtained from each anchor may be added together to determine a joint likelihood over the X-Y space. Using the distribution shown in FIG. 8c and equation (17), a position of the target tag 102 may be determined.

Figure 9:
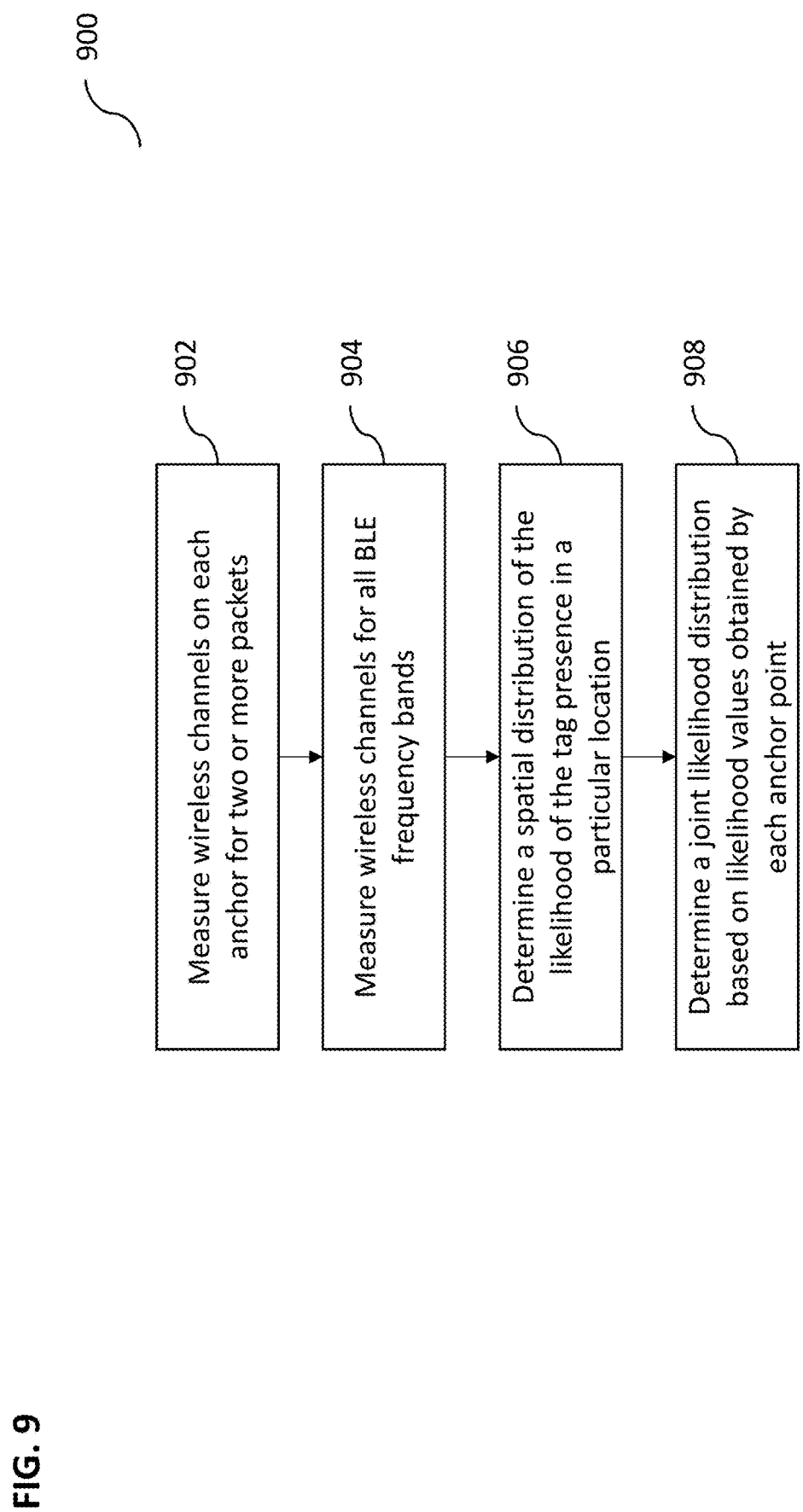
FIG. 9 illustrates an exemplary process for determining a position of a target BLE tag shown in FIG. 1, according to some implementations of the current subject matter.

FIG. 9 illustrates an exemplary process 900 for determining a position of a target BLE tag 102, according to some implementations of the current subject matter. The process 900 may be performed using one or more of above equations (e.g., equations (1)-(17)). At 902, wireless channels on each anchor may be measured for two or more packets. For example, one packet may be transmitted from the target tag 102 to the master anchor 104 and another packet may be transmitted from the master anchor 104 to the target tag 102. At 904, wireless channels above may be measured for all BLE frequency bands. At 906, the measured channels may be used in accordance with equation (17) (i.e., by computing $P_i$) to determine a spatial distribution of the likelihood of the tag presence in a particular location. At 908, the likelihood values obtained by each anchor point 104, 106 may be added to determine a joint likelihood distribution (e.g., as shown in FIG. 8c).

Referring back to FIG. 2, once the measured wireless channels on the anchors 104 have been measured and the likelihood of the tag 102 is positioned at a particular location in space has been calculated, the system 100 may be configured to eliminate multipath issues and/or isolate/select a direct path. In some implementations, a point with the highest likelihood may be selected. However, this might not be often the case, because of multipath effects and obstructions in an environment where the tag 102 and anchors 104, 106 may be operating (e.g., the direct path might not always be the strongest; reflections may be stronger than original transmissions). In some implementations, the system 100 may be configured to execute an exemplary process 1000 (shown in FIG. 10a) to isolate the direct path among all the existing paths and filter out any reflections.

Figure 10A:
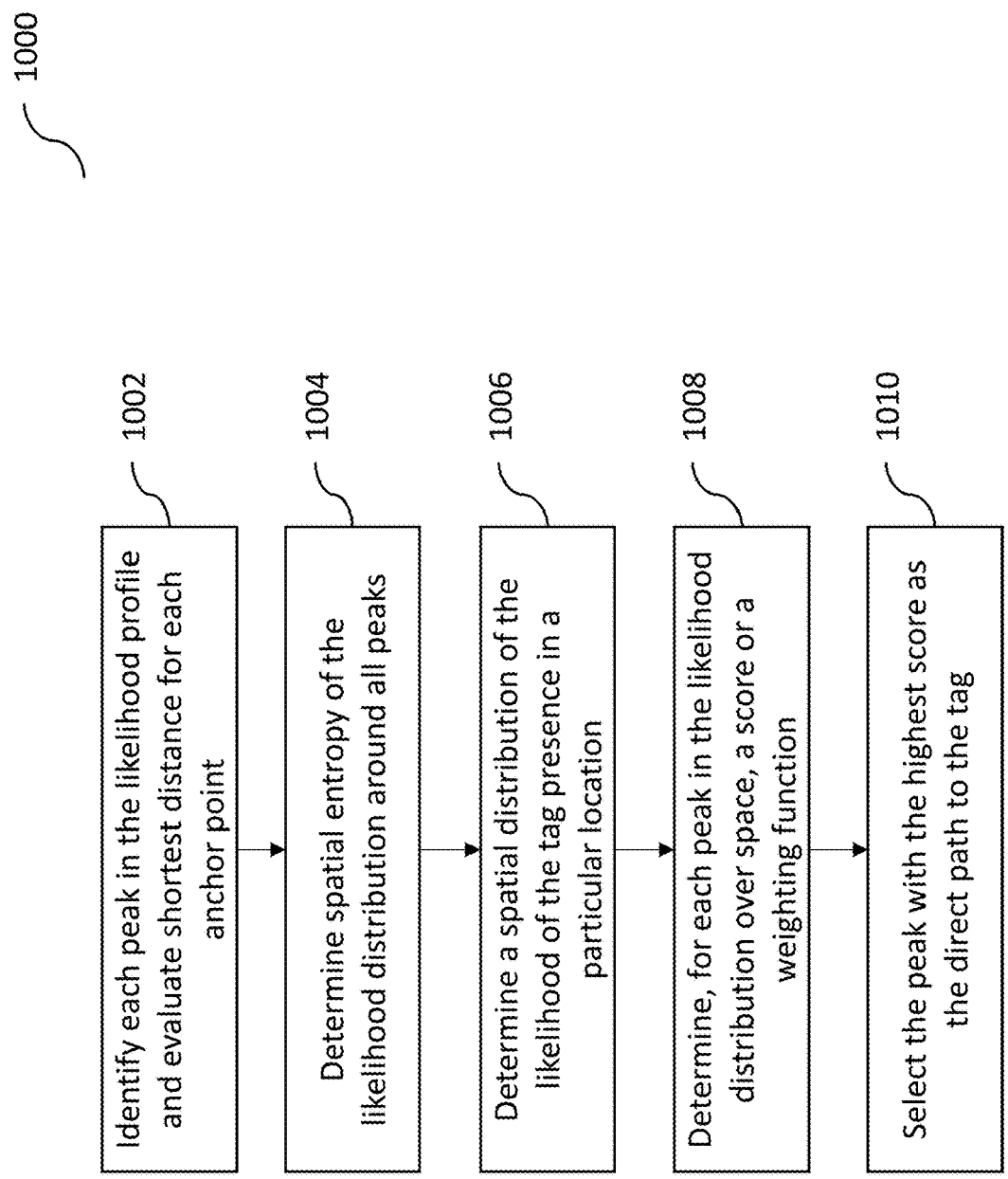
FIG. 10a illustrates an exemplary process for isolation of a direct path among all the existing paths and filtering out any reflections, according to some implementations of the current subject matter.

As shown in equation (16), the shortest path to the tag 102 may remain to be the shortest path even in the presence of multipath signals (e.g., reflections). This is because the reference distance (in this case, $$d\frac{00}{T} - d_{00}$$

is being subtracted from all the paths. Thus, the direct paths have shortest distance as compared to reflected paths. Hence, each peak in the likelihood profile may be identified, at 1002, as shown in FIG. 10a. For each peak in the likelihood profile, the shortest distance for each anchor point may be evaluated. Further, multipath reflections may be more spread out in space as opposed to direct paths, which may have higher peaks. This is because the direct paths are directly transmitted by an antenna, whereas the reflected paths reflect of off surfaces that might not be ideal reflectors and hence, scatter one or more parts of the incident signal.

Further, different anchors may detect reflections from different parts of the reflector, thereby making the likelihood distribution more spread out. To show this, a spatial entropy of the likelihood distribution around all peaks may be determined, at 1004; for example, for each peak in the likelihood distribution, the entropy of the likelihood distribution may be determined in its immediate neighborhood. If the likelihood distribution is almost flat, the entropy will be low and hence, the path is more likely a reflected path. Further, a spatial distribution of the likelihood of the tag presence in a particular location may be determined, at 1006.

Then, a weighted combination of these two factors (spatial entropy and summed up distances from all anchors) may be used to determine the position of the tag 102. For each peak in the likelihood distribution over space, a score or a weighting function, $s_x$ may be determined, at 1008, as follows:

$$s_x = p_x e^{b\mathcal{H} - a\Sigma_i d_i} \quad (18)$$

Figure 10B:
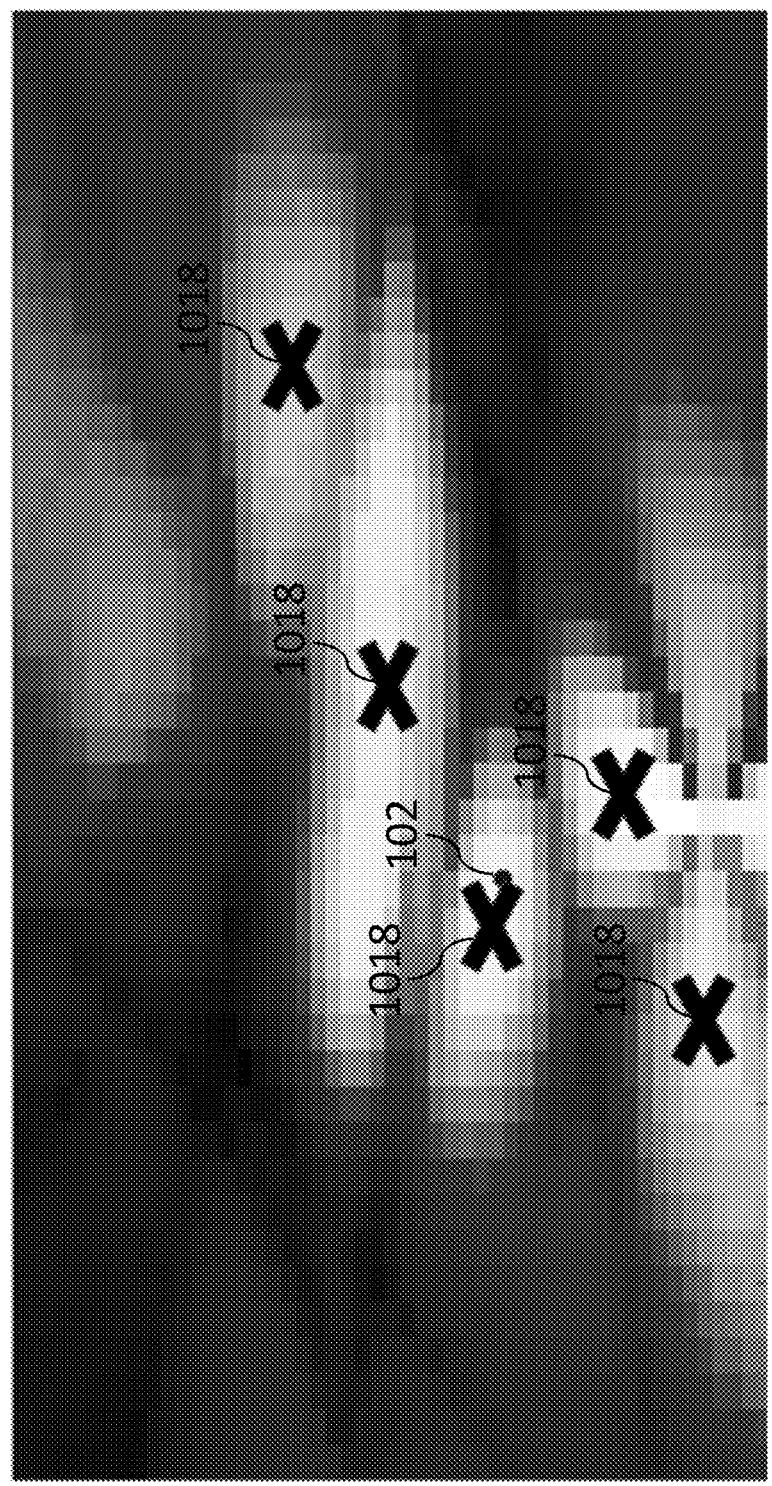
Figure 10C:
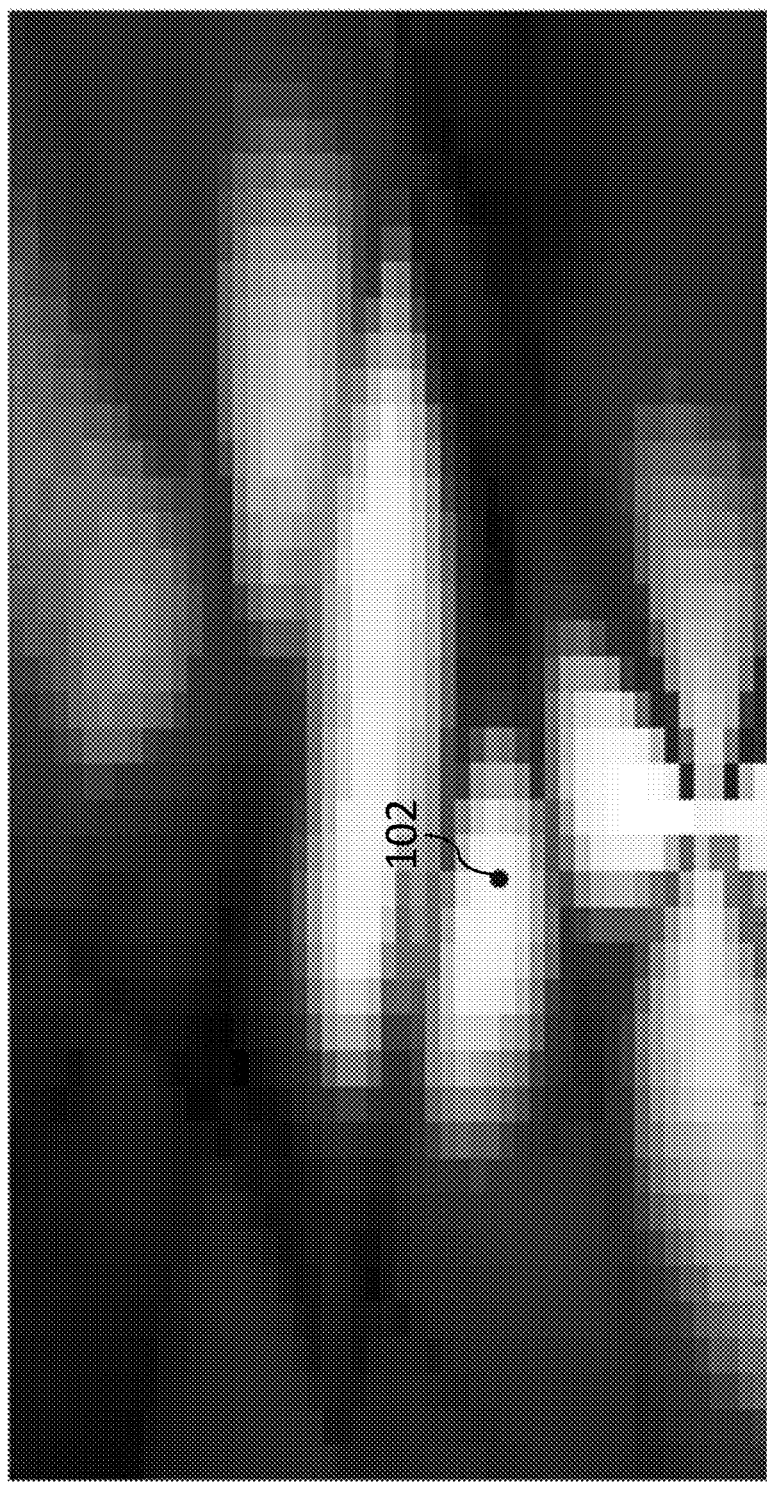

In equation (18), x is the location of the peak, $p_x$ is the joint likelihood value of the peak, $d_i$ is the distance measured from anchor i corresponding to this peak and H is the entropy in the neighborhood of the peak. a and b are weights for the two components of the score function. Once the score function has been determined for all peaks, the peak with the highest score may be selected as the direct path, at 1010. FIGS. 10b-c illustrate a location of the tag 102 and one or more peaks 1018 (local maxima) in the likelihood distribution over space, as determined by the process shown in FIG. 10a.

Figure 11A:
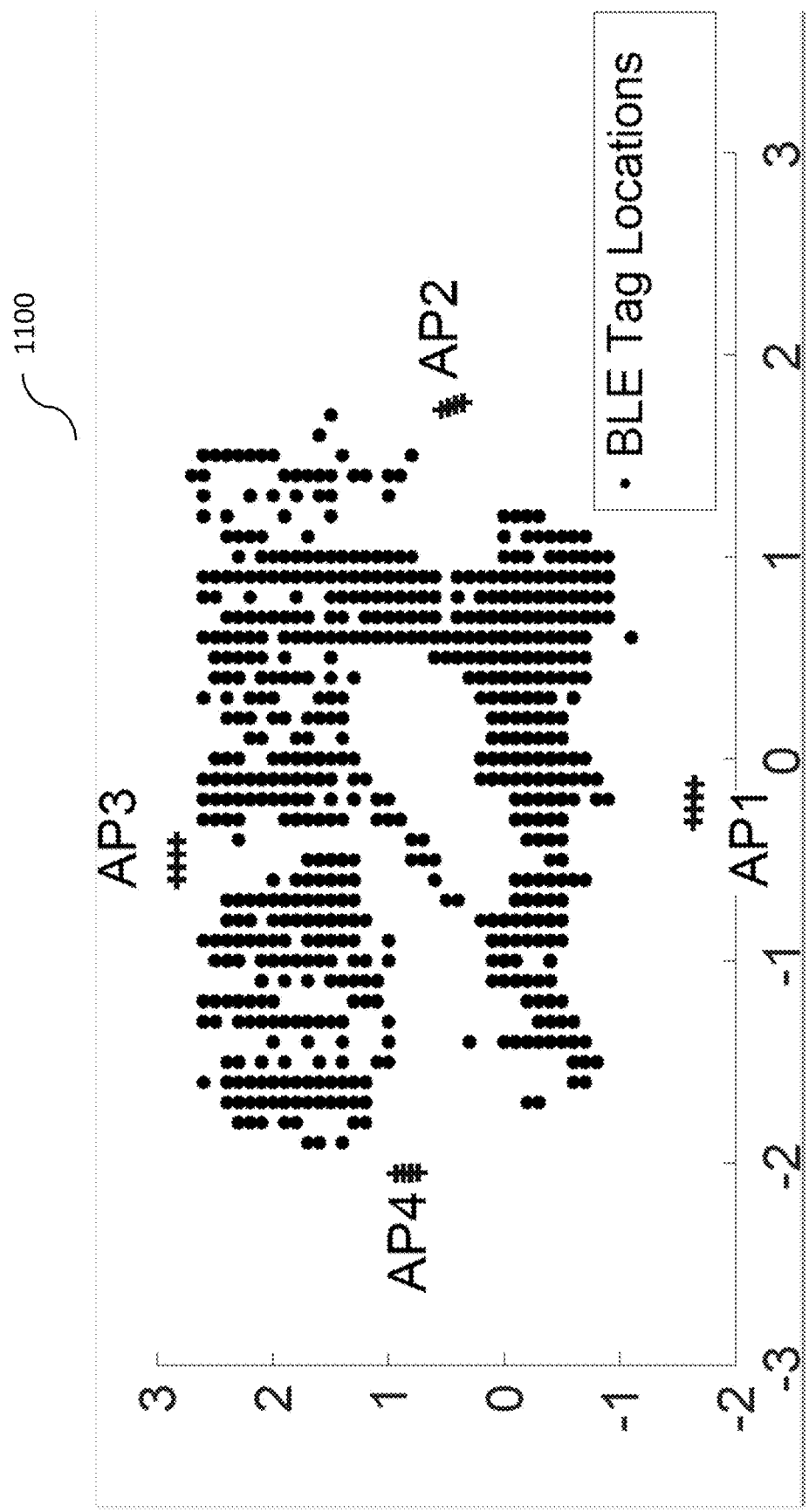
FIGS. 11a-b illustrate exemplary experimental determination of accurate location of a BLE tag, according to some implementations of the current subject matter.
Figure 11B:
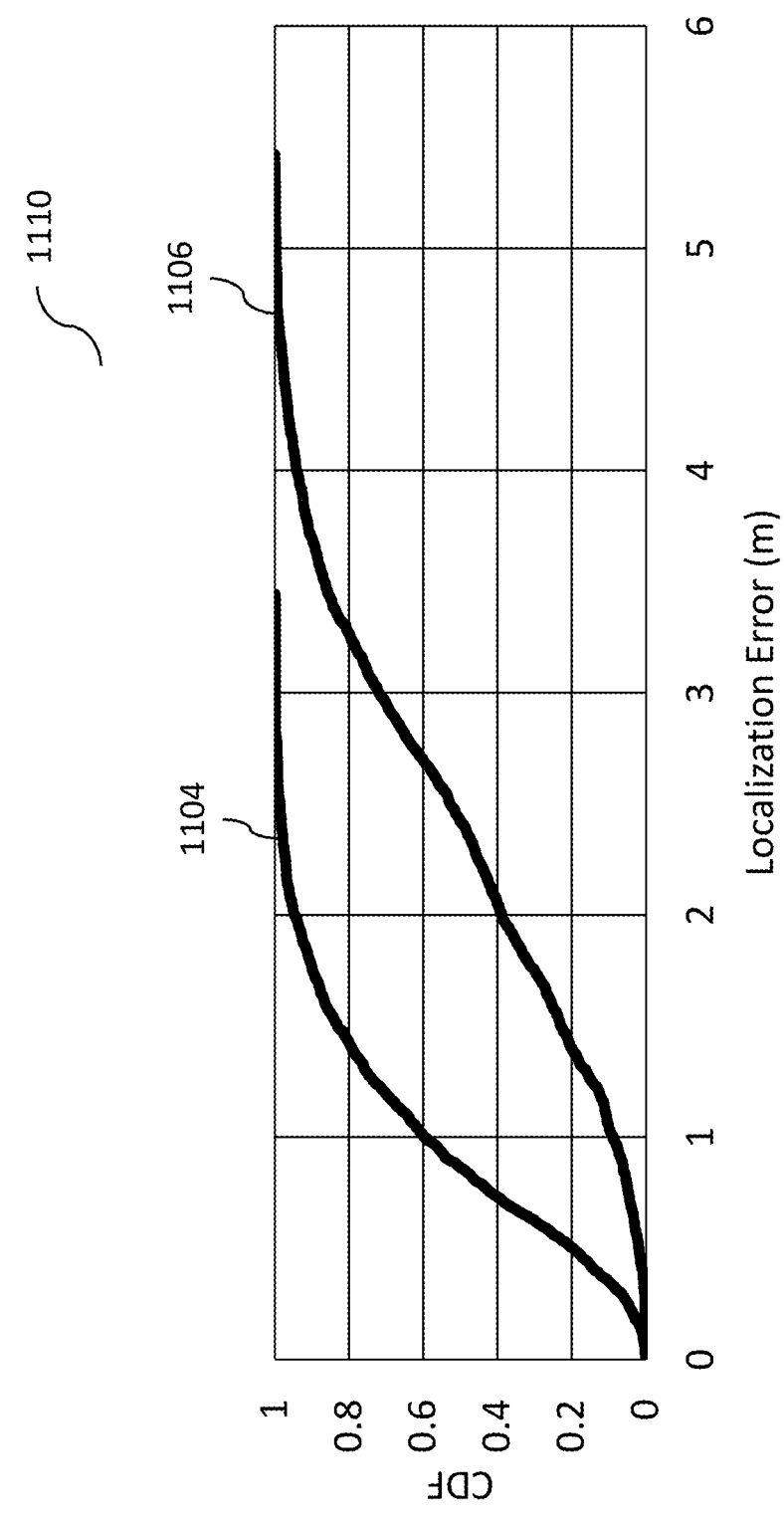

FIGS. 11a-b illustrate exemplary experimental determination of accurate location of a BLE tag using the processes discussed above with regard to FIGS. 1-10. In particular, FIG. 11a illustrates an exemplary environment 1100 (similar to the system 100 shown in FIG. 1) that may include four anchor points (AP1, AP2, AP3, and AP4) and various BLE tag locations (shown by dots). For this experimental evaluation, a single BLE tag was moved to 1700 different positions. The location of the BLE tag device was measured using two different processes: the current subject matter's process (as discussed above with regard to FIGS. 1-10) and using a conventional RSSI-based localization system. FIG. 11b illustrates exemplary plots comparing accuracy of BLE tag locations using these processes. In particular, curve 1104 illustrates BLE tag location, as determined using the current subject matter's process, and curve 1106 illustrates BLE tag location, as determined using the conventional RSSI-based localization system. The curve 1104 illustrates superior accuracy of the BLE tag location. In particular, the current subject matter's process was able to achieve a median location accuracy error of 86 cm, whereas the conventional system achieved a median location accuracy error of 242 cm. The 90th percentile of the localization error is 170 cm and 340 cm for current subject matter's process and the conventional system, respectively.

Figure 12A:
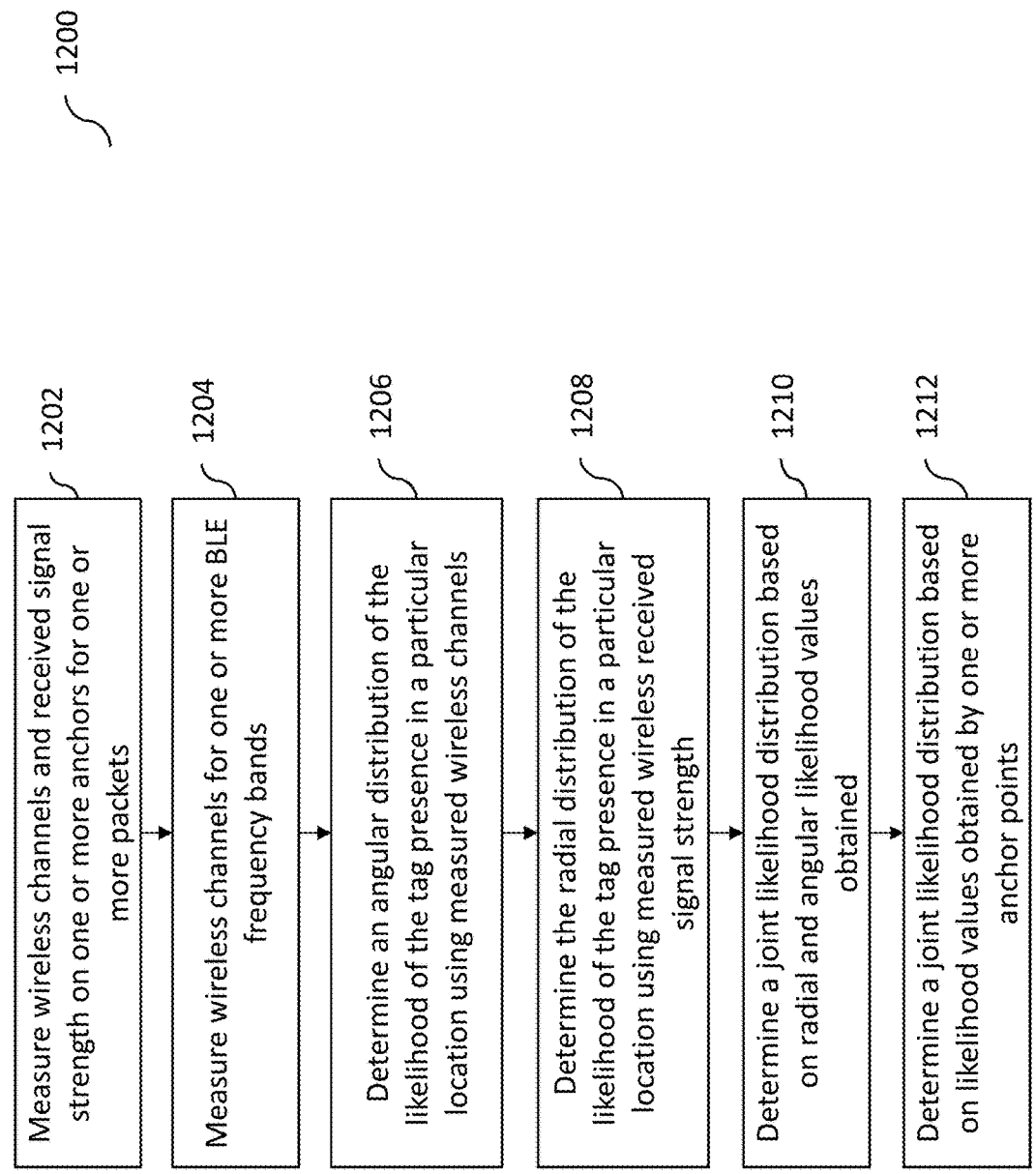
FIG. 12a illustrates an exemplary process for determining a position of a target BLE tag, according to some implementations of the current subject matter.
Figure 12B:
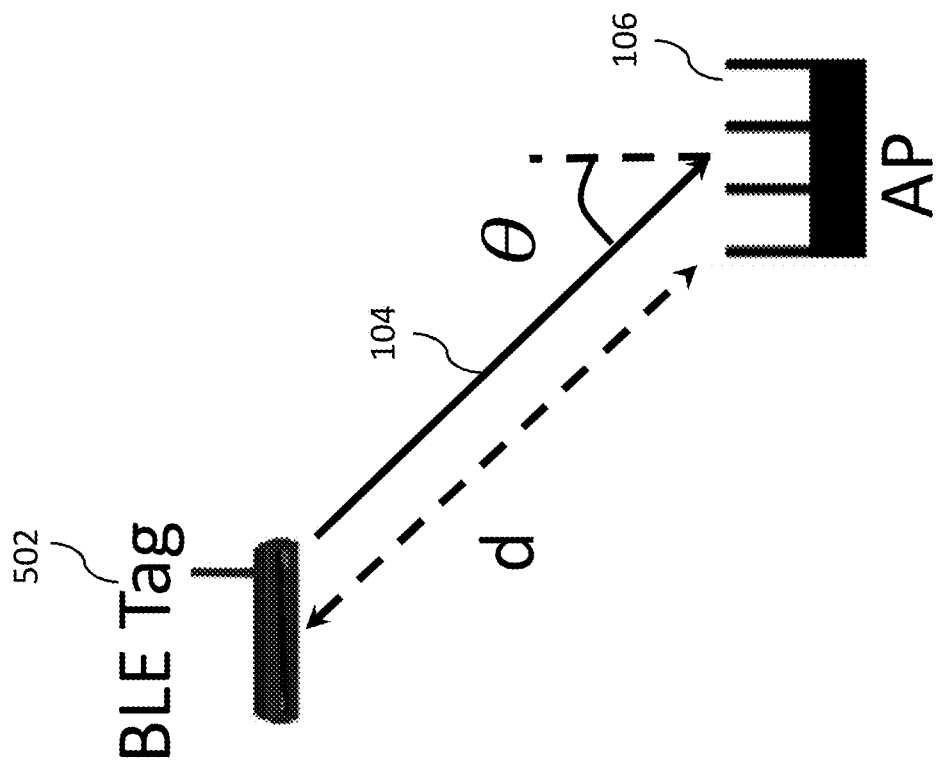
FIG. 12b illustrates an exemplary system for executing the process shown in FIG. 12a, according to some implementations of the current subject matter.

FIG. 12a illustrates an exemplary alternate process 1200 for determining a position of the target BLE tag 502, according to some implementations of the current subject matter. The process 1200 may be similar to the process 900 shown in FIG. 9 and may be used to determine a shortest length using the received signal strength. In some implementations, the process 1200 may be performed using one or more of above equations (e.g., equations (1)-(17)). FIG. 12b illustrates an exemplary communication system (e.g., that may include the BLE tag 502 and an anchor point 104, 106) that may be used to execute process 1200 shown in FIG. 12a. At 1202, wireless channels and received signal strength on one or more anchors (e.g., 104, 106) may be measured for one or more packets. At 1204, wireless channels above may be measured for one or more BLE frequency bands. At 1206, the measured channels may be used to determine an angular distribution of the likelihood of the tag presence in a particular location. At 1208, the received signal strength may be used to determine a radial distribution of the likelihood of the tag presence in a particular location. At 1210, a joint likelihood distribution may be determined using determined radial and/or angular likelihood values. At 1212, the likelihood values obtained by one or more anchor point 104, 106 may be used to determine a joint likelihood distribution.

Figure 13A:
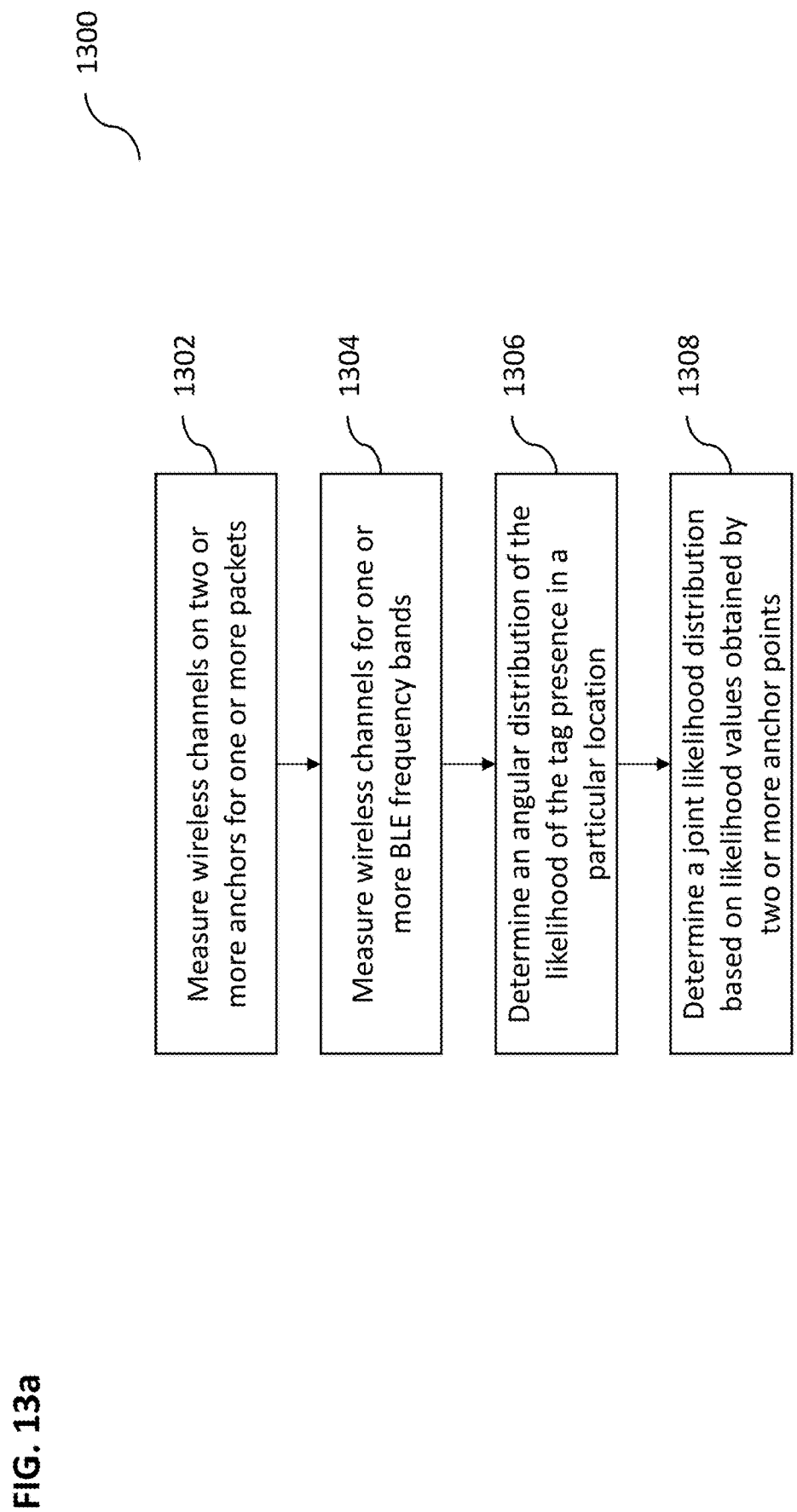
FIG. 13a illustrates another exemplary alternate process for determining a position of the target BLE tag, according to some implementations of the current subject matter.
Figure 13B:
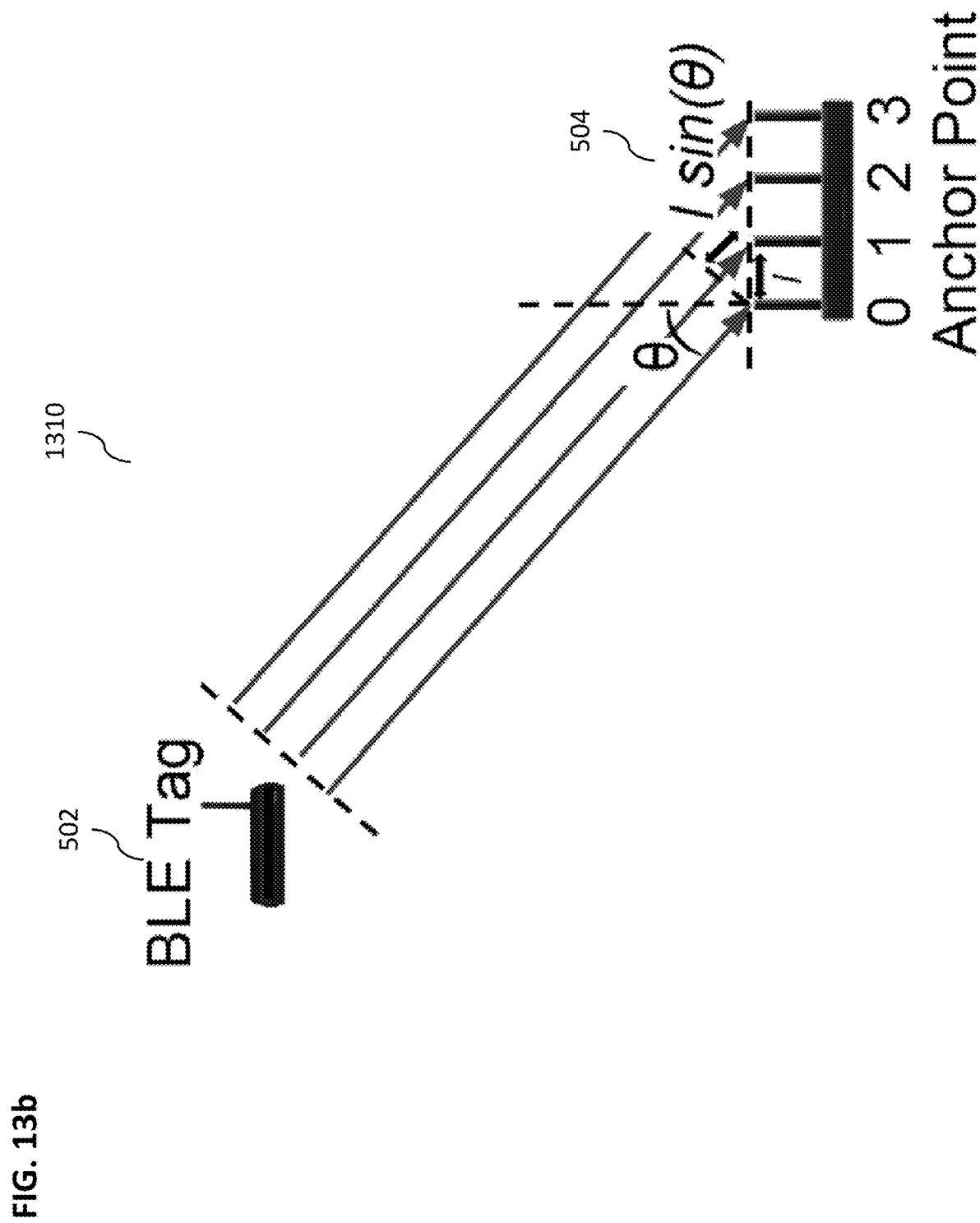
FIGS. 13b-c illustrate exemplary system executing the process shown in FIG. 13a, according to some implementations of the current subject matter.
Figure 13C:
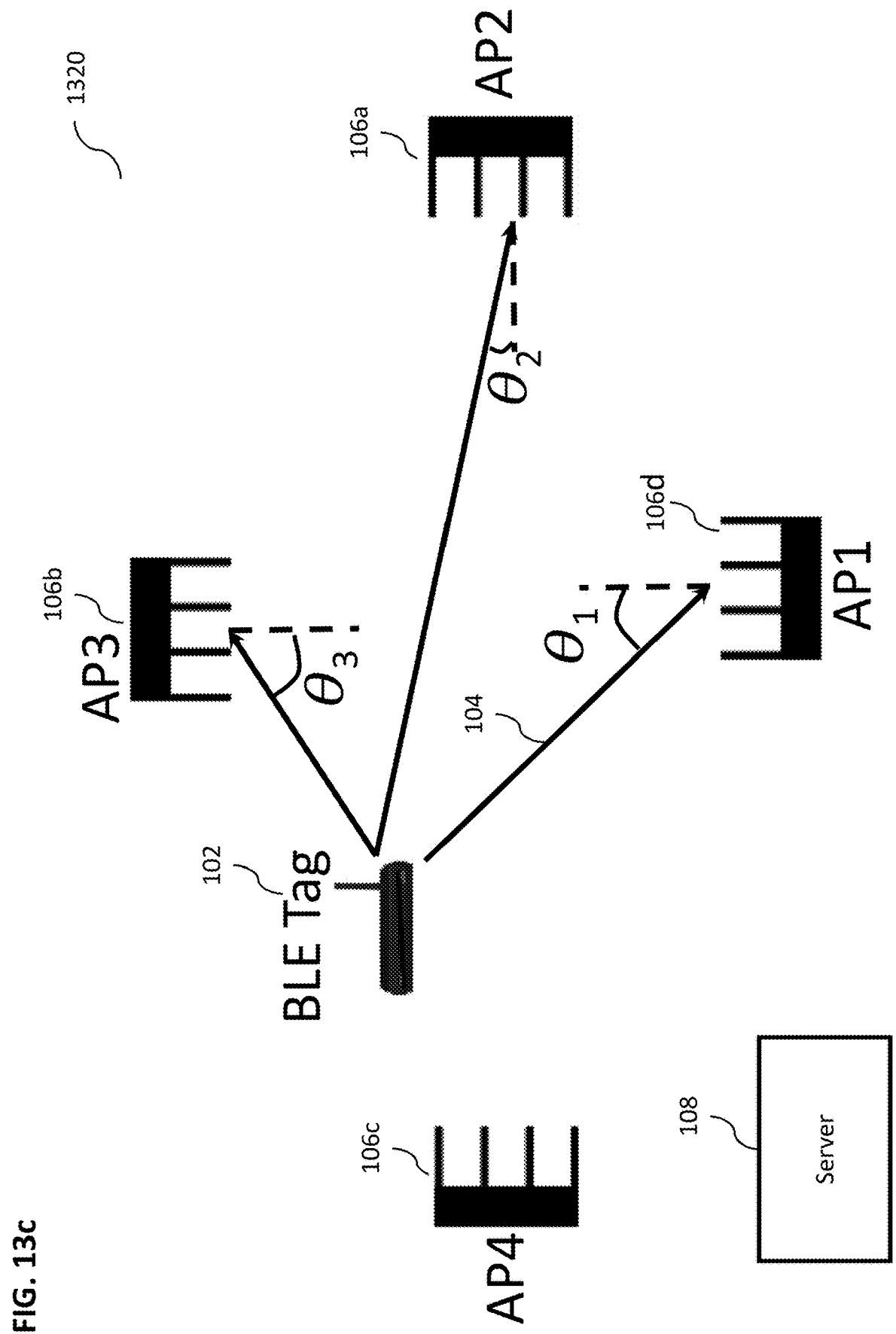

FIG. 13a illustrates another exemplary alternate process 1300 for determining a position of the target BLE tag, according to some implementations of the current subject matter. The process 1300 may also be similar to the process 900 shown in FIG. 9 and may be used to determine a position of the tag, where direction measurements (e.g., using sequences of 0's and 1's as described above) from two or more anchors may be used. The process 1300 may be used where the shortest length process (e.g., as described above) cannot or might not be implemented. In some implementations, the process 1300 may be performed using one or more of above equations (e.g., equations (1)-(17)). Further, the process 1300 may be executed using a systems 1310 (as shown in FIG. 13b) and/or 1320 (as shown in FIG. 13c). As stated above, the systems 1310, 1320 may be implemented when distance measurement might not be possible.

Referring to FIG. 13a, at 1302, wireless channels on two or more anchors (e.g., anchors 104, 106) may be measured for one or more packets. For example, packets may be transmitted between the target tag 102/502 and/or the master anchor 104/504 and/or anchor point 106 (e.g., as shown in FIGS. 13b-c). At 1304, wireless channels above may be measured for one or more BLE frequency bands. At 1306, the measured channels may be used to determine an angular distribution of the likelihood of the tag presence in a particular location. At 1308, the likelihood values obtained by two or more anchor points 104, 106 may be used to determine a joint likelihood distribution.

Figure 14:
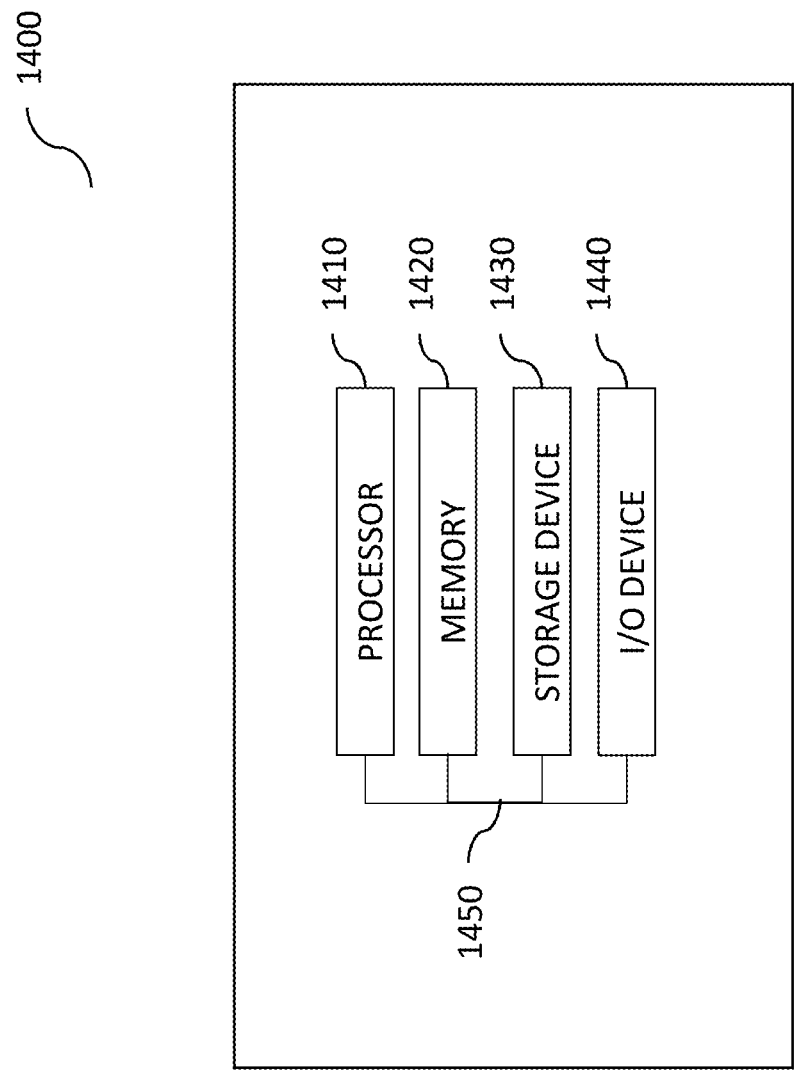
FIG. 14 illustrates an exemplary system, according to some implementations of the current subject matter.

In some implementations, the current subject matter can be configured to be implemented in a system 1400, as shown in FIG. 14. The system 1400 can include a processor 1410, a memory 1420, a storage device 1430, and an input/output device 1440. Each of the components 1410, 1420, 1430 and 1440 can be interconnected using a system bus 1450. The processor 1410 can be configured to process instructions for execution within the system 1400. In some implementations, the processor 1410 can be a single-threaded processor. In alternate implementations, the processor 1410 can be a multi-threaded processor. The processor 1410 can be further configured to process instructions stored in the memory 1420 or on the storage device 1430, including receiving or sending information through the input/output device 1440. The memory 1420 can store information within the system 1400. In some implementations, the memory 1420 can be a computer-readable medium. In alternate implementations, the memory 1420 can be a volatile memory unit. In yet some implementations, the memory 1420 can be a non-volatile memory unit. The storage device 1430 can be capable of providing mass storage for the system 1400. In some implementations, the storage device 1430 can be a computer-readable medium. In alternate implementations, the storage device 1430 can be a floppy disk device, a hard disk device, an optical disk device, a tape device, non-volatile solid state memory, or any other type of storage device. The input/output device 1440 can be configured to provide input/output operations for the system 1400. In some implementations, the input/output device 1440 can include a keyboard and/or pointing device. In alternate implementations, the input/output device 1440 can include a display unit for displaying graphical user interfaces.

Figure 15:
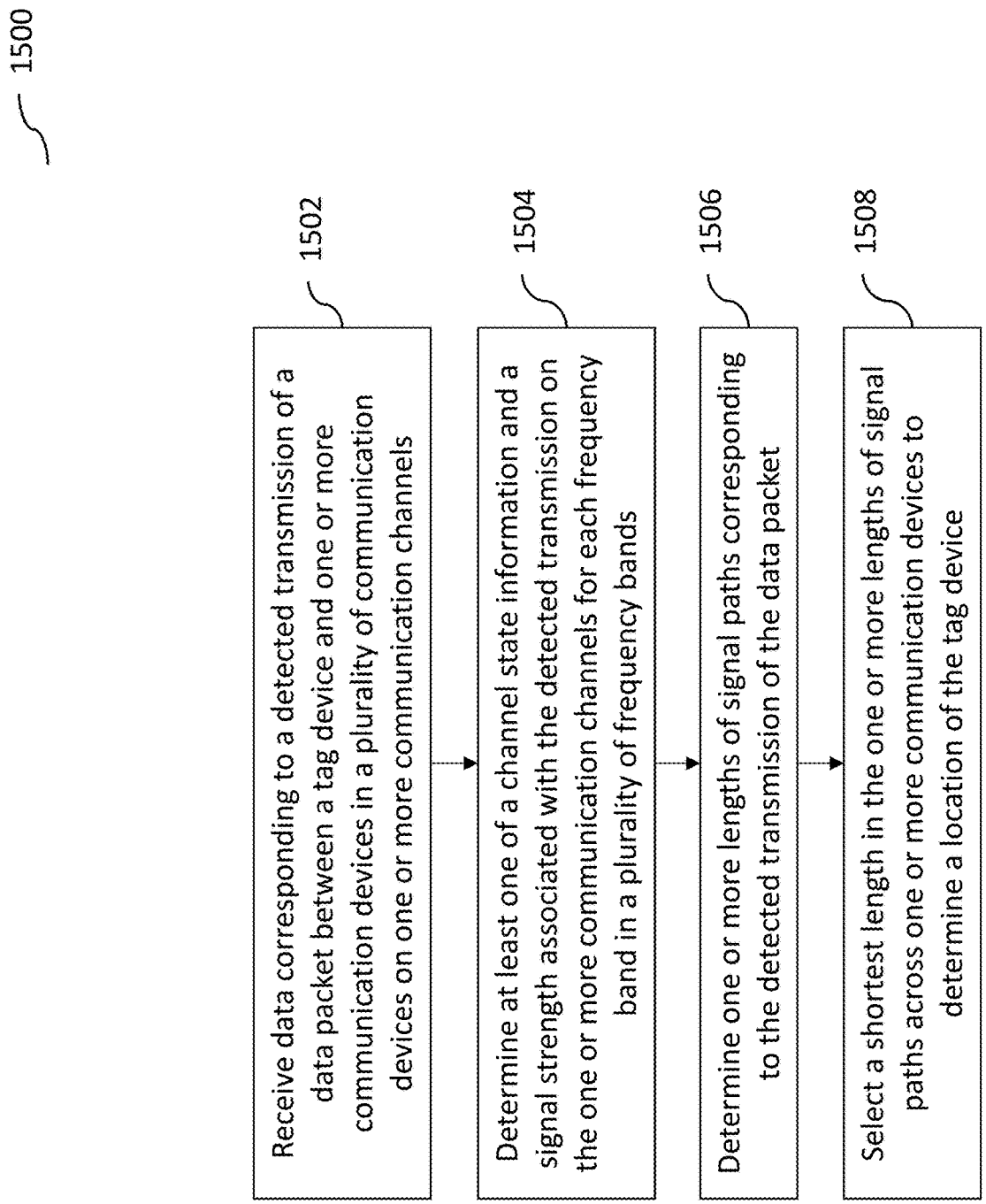
FIG. 15 illustrates an exemplary method, according to some implementations of the current subject matter.

FIG. 15 illustrates an exemplary method 1500 for determining a location of a device (e.g., a BLE tag), according to some implementations of the current subject matter. The method 1500 may be executed by a server 108 as shown in FIG. 1 upon receiving appropriate data related to transmissions between one or more BLE tags 102 and anchor communication devices 104 (as shown in FIG. 1). At 1502, the server may be configured to receive data corresponding to a detected transmission of a data packet between a tag device (e.g., device 102 as shown in FIG. 1) and one or more communication devices in a plurality of communication devices (e.g., devices 104, 106 shown in FIG. 1) on one or more communication channels.

At 1504, at least one a channel state information and a signal strength associated with the detected transmission may be determined on these communication channels for each frequency band in a plurality of frequency bands. For example, the channel state information may be determined across a plurality of BLE bands shown in FIG. 3, where the frequency bands may be combined so that a large frequency band may be emulated for the purposes of determining phase/amplitude of transmission signals.

At 1506, using the determined channel state information, one or more lengths of signal paths corresponding to the detected transmission of the data packet may be determined. The signal paths may be estimated in accordance with the equations above (e.g., equations (1)-(18).

At 1508, a shortest length from the lengths of signal paths one or more communication devices may be selected to determine a location of the tag device. In particular, equations (11)-(18) may be used for the purposes of estimating approximate locations of the BLE tag 102 as well as eliminating erroneous signals (e.g., reflections, etc.).

In some implementations, the current subject matter may include one or more of the following optional features. The tag device and the communication devices may be Bluetooth® low energy devices. Further, the data packet may include at least one of the following: a plurality of zero bits followed by a plurality of one bits, a plurality of one bits followed by a plurality of zero bits, a plurality of zero bits, a plurality of one bits, and any combination thereof. The plurality of zero bits may be a smoothed plurality of zero bits and the plurality of one bits is a plurality smoothed one bits (as for example, is shown in FIGS. 6a-b). The channel state information may be determined at at least one of the following: a first frequency (e.g., $f_0$) corresponding to the transmitted smoothed plurality of zero bits, and a second frequency corresponding to the transmitted smoothed plurality of one bits (e.g., $f_1$).

In some implementations, the channel state information determination may also include determining an average of the first and second frequencies. The phase and/or amplitude may be determined based on an angle of arrival of a signal (e.g., θ, as shown in FIG. 5), corresponding to the detected transmission, at the communication devices. In some implementations, the shortest length may be selected based on the signal strength (e.g., as shown in FIGS. 12a-b). The direction of the signal may be determined using the angle of arrival. Further, the shortest length may also be selected using the channel state information determined at at least one of the first frequency, the second frequency, or any combination thereof.

In some implementations, the communication devices may include a master communication device (e.g., device 104) and one or more slave communication devices (e.g., devices 106, as for example, is shown in FIG. 1). The slave communication devices may be configured to listen on the transmission of the data packet between the tag device (e.g., device 102) and the master communication device (e.g., device 104).

In some implementations, the channel state information determination may also include determining the channel state information for each frequency band in the plurality of frequency bands for each of the communication devices.

In some implementations, the method 15300 may also include determining one or more phase offsets for each frequency band in the plurality of frequency bands, and correcting, using the determined phases, the determined a channel state information associated with the detected transmission.

In some implementations, the shortest length may be selected using a spatial distribution of the signal paths corresponding to the detected transmission of the data packet.

In some implementations, the method may further include determining an angular distribution of the one or more signal paths corresponding to the detected transmission of the data packet. The location of the tag device is determined using one or more values corresponding to the determined angular distribution. This is similar to the discussion of FIGS. 13a-c above.

The systems and methods disclosed herein can be embodied in various forms including, for example, a data processor, such as a computer that also includes a database, digital electronic circuitry, firmware, software, or in combinations of them. Moreover, the above-noted features and other aspects and principles of the present disclosed implementations can be implemented in various environments. Such environments and related applications can be specially constructed for performing the various processes and operations according to the disclosed implementations or they can include a general-purpose computer or computing platform selectively activated or reconfigured by code to provide the necessary functionality. The processes disclosed herein are not inherently related to any particular computer, network, architecture, environment, or other apparatus, and can be implemented by a suitable combination of hardware, software, and/or firmware. For example, various general-purpose machines can be used with programs written in accordance with teachings of the disclosed implementations, or it can be more convenient to construct a specialized apparatus or system to perform the required methods and techniques.

Although ordinal numbers such as first, second, and the like can, in some situations, relate to an order; as used in this document ordinal numbers do not necessarily imply an order. For example, ordinal numbers can be merely used to distinguish one item from another. For example, to distinguish a first event from a second event, but need not imply any chronological ordering or a fixed reference system (such that a first event in one paragraph of the description can be different from a first event in another paragraph of the description).

The foregoing description is intended to illustrate but not to limit the scope of the invention, which is defined by the scope of the appended claims. Other implementations are within the scope of the following claims.

These computer programs, which can also be referred to programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid state memory or a magnetic hard drive or any equivalent storage medium. The machine-readable medium can alternatively or additionally store such machine instructions in a transient manner, such as for example as would a processor cache or other random access memory associated with one or more physical processor cores.

To provide for interaction with a user, the subject matter described herein can be implemented on a computer having a display device, such as for example a cathode ray tube (CRT) or a liquid crystal display (LCD) monitor for displaying information to the user and a keyboard and a pointing device, such as for example a mouse or a trackball, by which the user can provide input to the computer. Other kinds of devices can be used to provide for interaction with a user as well. For example, feedback provided to the user can be any form of sensory feedback, such as for example visual feedback, auditory feedback, or tactile feedback; and input from the user can be received in any form, including, but not limited to, acoustic, speech, or tactile input.

The subject matter described herein can be implemented in a computing system that includes a back-end component, such as for example one or more data servers, or that includes a middleware component, such as for example one or more application servers, or that includes a front-end component, such as for example one or more client computers having a graphical user interface or a Web browser through which a user can interact with an implementation of the subject matter described herein, or any combination of such back-end, middleware, or front-end components. The components of the system can be interconnected by any form or medium of digital data communication, such as for example a communication network. Examples of communication networks include, but are not limited to, a local area network ("LAN"), a wide area network ("WAN"), and the Internet.

The computing system can include clients and servers. A client and server are generally, but not exclusively, remote from each other and typically interact through a communication network. The relationship of client and server arises by virtue of computer programs running on the respective computers and having a client-server relationship to each other.

The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and sub-combinations of the disclosed features and/or combinations and sub-combinations of several further features disclosed above. In addition, the logic flows depicted in the accompanying figures and/or described herein do not necessarily require the particular order shown, or sequential order, to achieve desirable results. Other implementations can be within the scope of the following claims.

What is claimed:

1. A computer implemented method, comprising:
   receiving data corresponding to a detected transmission of a data packet between a first device configured to operate using a low power and one or more communication devices in a plurality of communication devices on one or more communication channels;
   determining at least one of a channel state information and a signal strength and a signal phase associated with the detected transmission on the one or more communication channels for each frequency band in a plurality of frequency bands;
   determining, based on the determined channel state information, one or more lengths of signal paths corresponding to the detected transmission of the data packet; and
   selecting a shortest length in the one or more lengths of signal paths across one or more communication devices to determine a location of the first device;
   wherein the one or more communication devices includes a master communication device and one or more slave communication devices, wherein the one or more slave communication devices are configured to listen on the transmission of the data packet between the first device and the master communication device.

2. The method according to claim 1, wherein the first device and the one or more communication devices are BLUETOOTH low energy devices.

3. The method according to claim 2, wherein the data packet includes at least one of the following: a plurality of zero bits followed by a plurality of one bits, a plurality of one bits followed by a plurality of zero bits, a plurality zero bits, a plurality of one bits, and any combination thereof.

4. The method according to claim 3, wherein the plurality of zero bits is a smoothed plurality of zero bits and the plurality of one bits is a plurality smoothed one bits.

5. The method according to claim 4, wherein the channel state information is determined at at least one of the following: a first frequency corresponding to the transmitted smoothed plurality of zero bits, and a second frequency corresponding to the transmitted smoothed plurality of one bits.

6. The method according to claim 5, wherein the determining channel state information further includes determining an average of the first and second frequencies, wherein at least one of the phase and amplitude is determined based on an angle of arrival of a signal, corresponding to the detected transmission, at the one or more communication devices.

7. The method according to claim 6, wherein the shortest length is selected based on the signal strength, wherein a direction of the signal is determined using the angle of arrival.

8. The method according to claim 6, wherein the shortest length is selected using channel state information determined at at least one of the first frequency, the second frequency, and any combination thereof.

9. The method according to claim 1, wherein determining the channel state information includes determining the channel state information for each frequency band in the plurality of frequency bands for each of the one or more communication devices.

10. The method according to claim 1, further comprising
    determining one or more phase offsets for each frequency band in the plurality of frequency bands; and
    correcting, using the one or more determined phases, the determined a channel state information associated with the detected transmission.

11. The method according to claim 1, wherein the shortest length is selected using a spatial distribution of the one or more signal paths corresponding to the detected transmission of the data packet.

12. The method according to claim 1, further comprising determining an angular distribution of the one or more signal paths corresponding to the detected transmission of the data packet, wherein the location of the first device is determined using one or more values corresponding to the determined angular distribution.

13. A system comprising:
    at least one programmable processor; and
    a non-transitory machine-readable medium storing instructions that, when executed by the at least one programmable processor, cause the at least one programmable processor to perform operations comprising:
    receiving data corresponding to a detected transmission of a data packet between a first device configured to operate using a low power and one or more communication devices in a plurality of communication devices on one or more communication channels;
    determining at least one of a channel state information and a signal strength and a signal phase associated with the detected transmission on the one or more communication channels for each frequency band in a plurality of frequency bands;
    determining, based on the determined channel state information, one or more lengths of signal paths corresponding to the detected transmission of the data packet; and
    selecting a shortest length in the one or more lengths of signal paths across one or more communication devices to determine a location of the first device;
    wherein the one or more communication devices include a master communication device and one or more slave communication devices, wherein the one or more slave communication devices are configured to listen on the transmission of the data packet between the first device and the master communication device.

14. The system according to claim 13, wherein the first device and the one or more communication devices are BLUETOOTH low energy devices;
- wherein the data packet includes at least one of the following: a plurality of zero bits followed by a plurality of one bits, a plurality of one bits followed by a plurality of zero bits, a plurality zero bits, a plurality of one bits, and any combination thereof;
- wherein the plurality of zero bits is a smoothed plurality of zero bits and the plurality of one bits is a plurality smoothed one bits.

15. The system according to claim 14, wherein the channel state information is determined at at least one of the following: a first frequency corresponding to the transmitted smoothed plurality of zero bits, and a second frequency corresponding to the transmitted smoothed plurality of one bits.

16. The system according to claim 15, wherein the determining channel state information further includes determining an average of the first and second frequencies, wherein at least one of the phase and amplitude is determined based on an angle of arrival of a signal, corresponding to the detected transmission, at the one or more communication devices.

17. The system according to claim 16, wherein the shortest length is selected based on the signal strength, wherein a direction of the signal is determined using the angle of arrival.

18. The system according to claim 16, wherein the shortest length is selected using channel state information determined at at least one of the first frequency, the second frequency, and any combination thereof.

19. A computer program product comprising a non-transitory machine-readable medium storing instructions that, when executed by at least one programmable processor, cause the at least one programmable processor to perform operations comprising:
- receiving data corresponding to a detected transmission of a data packet between a first device configured to operate using a low power and one or more communication devices in a plurality of communication devices on one or more communication channels;
- determining at least one of a channel state information and a signal strength and a signal phase associated with the detected transmission on the one or more communication channels for each frequency band in a plurality of frequency bands;
- determining, based on the determined channel state information, one or more lengths of signal paths corresponding to the detected transmission of the data packet; and
- selecting a shortest length in the one or more lengths of signal paths across one or more communication devices to determine a location of the first device;
- wherein the one or more communication devices include a master communication device and one or more slave communication devices, wherein the one or more slave communication devices are configured to listen on the transmission of the data packet between the first device and the master communication device.

* * * * *